(12) United States Patent
Du et al.

(10) Patent No.: US 10,439,765 B2
(45) Date of Patent: Oct. 8, 2019

(54) BLOCK ACKNOWLEDGEMENT FRAME TRANSMISSION METHOD AND DEVICE

(71) Applicant: Huawei Technologies Co., Ltd., Shenzhen (CN)

(72) Inventors: Zhenguo Du, Shenzhen (CN); Meilu Lin, Shenzhen (CN)

(73) Assignee: Huawei Technologies Co., Ltd,., Shenzhen (CN)

( * ) Notice: Subject to any disclaimer, the term of this patent is extended or adjusted under 35 U.S.C. 154(b) by 1 day.

(21) Appl. No.: 15/809,481

(22) Filed: Nov. 10, 2017

(65) Prior Publication Data

US 2018/0069663 A1 Mar. 8, 2018

Related U.S. Application Data

(63) Continuation of application No. PCT/CN2016/081289, filed on May 6, 2016.

(30) Foreign Application Priority Data

| May 12, 2015 | (CN) | 2015 1 0239949 |
| Jun. 10, 2015 | (CN) | 2015 1 0317627 |
| Feb. 6, 2016 | (CN) | 2016 1 0084149 |

(51) Int. Cl.
*H04L 1/16* (2006.01)
*H04L 1/18* (2006.01)
(Continued)

(52) U.S. Cl.
CPC .......... *H04L 1/1614* (2013.01); *H04L 1/1621* (2013.01); *H04L 1/1864* (2013.01); *H04L 69/323* (2013.01); *H04W 84/12* (2013.01)

(58) Field of Classification Search
CPC ..... H04L 1/614; H04L 1/1864; H04L 1/1621; H04L 69/123; H04W 84/12
See application file for complete search history.

(56) References Cited

U.S. PATENT DOCUMENTS

| 2006/0018268 A1 | 1/2006 | Kakani et al. |
| 2006/0034317 A1* | 2/2006 | Hong ................ H04L 1/1614 370/445 |

(Continued)

FOREIGN PATENT DOCUMENTS

| CN | 1734998 A | 2/2006 |
| CN | 1849772 A | 10/2006 |

(Continued)

*Primary Examiner* — Mohammad S Anwar
(74) *Attorney, Agent, or Firm* — Slater Matsil, LLP

(57) ABSTRACT

A BA frame transmission method comprises: receiving, by a receiving device, at least one PPDU sent by at least one transmitting device, where the PPDU includes at least one MPDU; and generating a BA frame according to a receiving status of the at least one MPDU in the at least one PPDU sent by each of the at least one transmitting device, and sending the BA frame to the at least one transmitting device, where the BA frame includes BA information corresponding to each of the at least one transmitting device, the BA information includes a block acknowledgement bitmap field and a bitmap length indicator, the bitmap length indicator is used to indicate a length of the block acknowledgement bitmap field, and the bitmap length indicator is carried in a block acknowledgement starting sequence control field included in the BA information corresponding to the transmitting device in the BA frame.

20 Claims, 7 Drawing Sheets

(51) Int. Cl.
    *H04L 29/08*     (2006.01)
    *H04W 84/12*     (2009.01)

(56) References Cited

U.S. PATENT DOCUMENTS

| | | |
|---|---|---|
| 2006/0048034 A1 | 3/2006 | Cho |
| 2012/0207087 A1 | 8/2012 | Wentink et al. |
| 2013/0170345 A1* | 7/2013 | Merlin ............... H04W 28/065 370/230 |
| 2013/0223345 A1* | 8/2013 | Asterjadhi ............. H04L 69/04 370/328 |
| 2015/0296532 A1 | 10/2015 | Zhou et al. |
| 2018/0069663 A1 | 3/2018 | Du et al. |

FOREIGN PATENT DOCUMENTS

| | | |
|---|---|---|
| CN | 101006684 A | 7/2007 |
| CN | 101124762 A | 2/2008 |
| CN | 103081394 A | 5/2013 |
| CN | 104541568 A | 4/2015 |
| CN | 106161583 A | 11/2016 |
| EP | 1661287 B1 | 10/2011 |

* cited by examiner

BLOCK ACKNOWLEDGEMENT FRAME TRANSMISSION METHOD AND DEVICE

CROSS-REFERENCE TO RELATED APPLICATIONS

This application is a continuation application of International Application No. PCT/CN2016/081289, filed on May 6, 2016, which claims priority to Chinese Patent Application No. 201510239949.1, filed on May 12, 2015, Chinese Patent Application No. 201510317627.4, filed on Jun. 10, 2015, and Chinese Patent Application No. 201610084149.1, filed on Feb. 6, 2016. All of the aforementioned patent applications are hereby incorporated by reference in their entireties.

TECHNICAL FIELD

The present invention relates to the communications field, and in particular, to a block acknowledgement frame transmission method and a device.

BACKGROUND

In a Wireless Fidelity (WiFi for short) system based on an IEEE 802.11 protocol, a protocol stack of a radio interface includes a Medium Access Control (MAC for short) layer protocol. To reduce an inter frame space, channel contention time, and repeated transmission of a physical header when data transmission is performed by using the MAC layer protocol, 802.11n proposes a MAC layer aggregate transmission mechanism, referred to as an Aggregate MAC Protocol Data Unit (A-MPDU for short). In the MAC layer aggregate transmission mechanism, one physical layer convergence procedure Protocol Data Unit (PPDU for short) using an A-MPDU structure may include at least one MAC Protocol Data Unit (MPDU for short), where all MPDUs included in the PPDU are sent to a same receiving device.

As stipulated in an existing standard, when a receiving device receives a PPDU using an A-MPDU structure, the receiving device needs to reply to a transmitting device with a block acknowledgement (BA for short) frame, where the BA frame includes a block acknowledgement bitmap (BA Bitmap) field, and each bit of the BA Bitmap field corresponds to one of all MPDUs whose receiving statuses need to be fed back.

Because a maximum of 64 MPDUs can be aggregated in a PPDU using an A-MPDU structure, it is stipulated in the existing standard that a length of a BA Bitmap field is always 64 bits. However, in actual application, a quantity of MPDUs aggregated in the PPDU using the A-MPDU structure is far less than 64. In this case, if the length of the BA Bitmap field is still 64 bits, BA Bitmap field redundancy may be caused, resulting in resource waste.

SUMMARY

The present invention provides a block acknowledgement frame transmission method and a device, so as to resolve a resource waste problem caused by BA Bitmap field redundancy.

To achieve the foregoing objective, the following technical solutions are used in the present invention.

A first aspect of the embodiments of the present invention provides a block acknowledgement frame transmission method. The method includes receiving, by a receiving device, at least one physical layer convergence procedure Protocol Data Unit PPDU sent by at least one transmitting device, where the PPDU includes at least one Medium Access Control Protocol Data Unit MPDU. The method also includes generating, by the receiving device, a block acknowledgement BA frame according to a receiving status of the at least one MPDU in the at least one PPDU sent by each of the at least one transmitting device, and sending the BA frame to each of the at least one transmitting device. The BA frame includes BA information corresponding to each of the at least one transmitting device, the BA information includes a block acknowledgement bitmap field and a bitmap length indicator, the bitmap length indicator is used to indicate a length of the block acknowledgement bitmap field, and the bitmap length indicator is carried in a block acknowledgement starting sequence control field included in the BA information corresponding to the transmitting device in the BA frame.

With reference to the first aspect, in a first possible implementation manner, the generating, by the receiving device, a block acknowledgement BA frame according to a receiving status of the at least one MPDU in the at least one PPDU sent by each of the at least one transmitting device includes: for each of the at least one transmitting device, determining, by the receiving device, the length of the block acknowledgement bitmap field corresponding to the transmitting device, according to a difference between a largest sequence number and a smallest sequence number of a correctly received MPDU sent by the transmitting device; determining the block acknowledgement bitmap field corresponding to the transmitting device, according to the length of the block acknowledgement bitmap field corresponding to the transmitting device; and determining the bitmap length indicator corresponding to the transmitting device; and generating, by the receiving device, the BA frame according to the bitmap length indicator corresponding to each transmitting device and the block acknowledgement bitmap field corresponding to each transmitting device.

With reference to the first possible implementation manner of the first aspect, in a second possible implementation manner, the determining the length of the block acknowledgement bitmap field corresponding to the transmitting device is specifically: determining, by the receiving device, the length of the block acknowledgement bitmap field corresponding to the transmitting device, according to a difference between a largest sequence number and a smallest sequence number of a correctly received MPDU sent by the transmitting device.

With reference to the first possible implementation manner of the first aspect, in a third possible implementation manner, the determining the length of the block acknowledgement bitmap field corresponding to the transmitting device is specifically: determining, by the receiving device, the length of the block acknowledgement bitmap field corresponding to the transmitting device, according to a difference between a largest sequence number of a correctly received MPDU sent by the transmitting device and a smallest sequence number of MPDUs that are not correctly received and that are sent by the transmitting device.

With reference to the third possible implementation manner of the first aspect, in a fourth possible implementation manner, the block acknowledgement starting sequence control field included in the BA information corresponding to the transmitting device includes a starting sequence number subfield, and a value of the starting sequence number subfield is set to the smallest sequence number of the MPDUs that are not correctly received and that are sent by the transmitting device, and represents that a sequence number corresponding to the first bit of the block acknowledgement bitmap field is the smallest sequence number and MPDUs corresponding to all sequence numbers preceding the smallest sequence number are correctly received.

With reference to any one of the first aspect, or the foregoing possible implementation manners, in a fifth possible implementation manner, before the generating, by the receiving device, a block acknowledgement BA frame according to a receiving status of the at least one MPDU in the at least one PPDU sent by each of the at least one transmitting device, the method further includes: for each of the at least one transmitting device, determining, by the receiving device, to set an acknowledgement indicator in a per traffic identifier TID information field included in the BA information corresponding to the transmitting device to a first value, where the first value represents that the BA information corresponding to the transmitting device includes the block acknowledgement starting sequence control field and the block acknowledgement bitmap field.

With reference to any one of the first aspect or the foregoing possible implementation manners, in a sixth possible implementation manner, the bitmap length indicator is carried in a fragment number subfield in the block acknowledgement starting sequence control field included in the BA information corresponding to the transmitting device in the BA frame.

With reference to any one of the first to fourth possible implementation manners of the first aspect, in a seventh possible implementation manner, the determining the bitmap length indicator corresponding to the transmitting device includes: determining, by the receiving device, the bitmap length indicator corresponding to the transmitting device, according to the length of the block acknowledgement bitmap field corresponding to the transmitting device and a preset first mapping relationship, where the first mapping relationship is used to indicate a bitmap length indicator corresponding to a length of at least one block acknowledgement bitmap field.

With reference to the second possible implementation manner of the first aspect, in an eighth possible implementation manner, the determining the length of the block acknowledgement bitmap field corresponding to the transmitting device, according to a difference between a largest sequence number and a smallest sequence number of a correctly received MPDU sent by the transmitting device includes: determining, by the receiving device, a quantity of MPDUs whose receiving statuses need to be fed back, according to the difference between the largest sequence number and the smallest sequence number of the correctly received MPDU sent by the transmitting device; determining, by the receiving device, a quantity of bytes required for feeding back whether an MPDU is correctly received, according to a largest fragment number of the correctly received MPDU sent by the transmitting device; and determining, by the receiving device, the length of the block acknowledgement bitmap field corresponding to the transmitting device, according to the quantity of MPDUs whose receiving statuses need to be fed back and the quantity of bytes required for feeding back whether an MPDU is correctly received.

With reference to the eighth possible implementation manner of the first aspect, in a ninth possible implementation manner, the determining the bitmap length indicator corresponding to the transmitting device includes: determining, by the receiving device, a quantity indicator corresponding to the transmitting device, according to the quantity of MPDUs whose receiving statuses need to be fed back and a preset second mapping relationship, where the quantity indicator is used to indicate the quantity of MPDUs whose receiving statuses need to be fed back, and the second mapping relationship is used to indicate a quantity indicator corresponding to a quantity of at least one MPDU whose receiving status needs to be fed back; determining, by the receiving device, a flag indicator corresponding to the transmitting device, according to the largest fragment number of the correctly received MPDU sent by the transmitting device, where the flag indicator is used to indicate the quantity of bytes required for feeding back whether an MPDU is correctly received; and combining, by the receiving device, the quantity indicator corresponding to the transmitting device and the flag indicator corresponding to the transmitting device, to generate the bitmap length indicator corresponding to the transmitting device.

A second aspect of the embodiments of the present invention provides a block acknowledgement frame transmission method. The method includes sending, by a transmitting device, at least one physical layer convergence procedure Protocol Data Unit PPDU to a receiving device, where the PPDU includes at least one Medium Access Control Protocol Data Unit MPDU. The method also includes receiving, by the transmitting device, a block acknowledgement BA frame sent by the receiving device. The BA frame includes BA information corresponding to the transmitting device, the BA information includes a block acknowledgement bitmap field and a bitmap length indicator, the bitmap length indicator is used to indicate a length of the block acknowledgement bitmap field, and the bitmap length indicator is carried in a block acknowledgement starting sequence control field included in the BA information corresponding to the transmitting device in the BA frame.

With reference to the second aspect, in a first possible implementation manner, the length of the block acknowledgement bitmap field is determined by the receiving device according to a difference between a largest sequence number and a smallest sequence number of a correctly received MPDU sent by the transmitting device.

With reference to the second aspect, in a second possible implementation manner, the length of the block acknowledgement bitmap field is determined by the receiving device according to a difference between a largest sequence number of a correctly received MPDU sent by the transmitting device and a smallest sequence number of MPDUs that are not correctly received and that are sent by the transmitting device.

With reference to the second possible implementation manner of the second aspect, in a third possible implementation manner, the block acknowledgement starting sequence control field included in the BA information corresponding to the transmitting device includes a starting sequence number subfield, and a value of the starting sequence number subfield is set to the smallest sequence number of the MPDUs that are not correctly received and that are sent by the transmitting device, and represents that a sequence number corresponding to the first bit of the block acknowledgement bitmap field is the smallest sequence number and MPDUs corresponding to all sequence numbers preceding the smallest sequence number are correctly received.

With reference to any one of the second aspect or the foregoing possible implementation manners, in a fourth possible implementation manner, the bitmap length indicator is carried in a fragment number subfield in the block acknowledgement starting sequence control field included in the BA information corresponding to the transmitting device in the BA frame.

With reference to any one of the second aspect or the foregoing possible implementation manners, in a fifth possible implementation manner, after the receiving, by the transmitting device, a block acknowledgement BA frame sent by the receiving device, the method further includes: determining, by the transmitting device, the length of the block acknowledgement bitmap field included in the BA information corresponding to the transmitting device, according to the bitmap length indicator.

With reference to the fifth possible implementation manner of the second aspect, in a sixth possible implementation manner, the determining, by the transmitting device, the length of the block acknowledgement bitmap field included in the BA information corresponding to the transmitting device, according to the bitmap length indicator includes: determining, by the transmitting device, the length of the block acknowledgement bitmap field included in the BA information corresponding to the transmitting device, according to the bitmap length indicator and a preset first mapping relationship, where the first mapping relationship is used to indicate a length of a block acknowledgement bitmap field corresponding to at least one bitmap length indicator.

With reference to the fifth possible implementation manner of the second aspect, in a seventh possible implementation manner, the determining, by the transmitting device, the length of the block acknowledgement bitmap field included in the BA information corresponding to the transmitting device, according to the bitmap length indicator includes: determining, by the transmitting device, a quantity of MPDUs whose receiving statuses need to be fed back, according to a quantity indicator in the bitmap length indicator and a preset second mapping relationship, where the quantity indicator is used to indicate the quantity of MPDUs whose receiving statuses need to be fed back by the receiving device, and the second mapping relationship is used to indicate a quantity indicator corresponding to a quantity of at least one MPDU whose receiving status is fed back; determining, by the transmitting device, a quantity of bytes required for feeding back whether an MPDU is correctly received, according to a flag indicator in the bitmap length indicator, where the flag indicator is used to indicate the quantity of bytes required by the receiving device to feed back whether an MPDU is correctly received; and determining, by the transmitting device, the length of the block acknowledgement bitmap field included in the BA information corresponding to the transmitting device, according to the quantity of MPDUs whose receiving statuses need to be fed back and the quantity of bytes required for feeding back whether an MPDU is correctly received.

A third aspect of the embodiments of the present invention provides a receiving device. The receiving device includes a receiving unit, configured to receive at least one physical layer convergence procedure Protocol Data Unit PPDU sent by at least one transmitting device, where the PPDU includes at least one Medium Access Control Protocol Data Unit MPDU. The receiving device also includes a generation unit, configured to generate a block acknowledgement BA frame according to a receiving status of the at least one MPDU in the at least one PPDU that is sent by each of the at least one transmitting device and that is received by the receiving unit. The receiving device also includes a sending unit, configured to send the BA frame generated by the generation unit to each of the at least one transmitting device. The BA frame includes BA information corresponding to each of the at least one transmitting device, the BA information includes a block acknowledgement bitmap field and a bitmap length indicator, the bitmap length indicator is used to indicate a length of the block acknowledgement bitmap field, and the bitmap length indicator is carried in a block acknowledgement starting sequence control field included in the BA information corresponding to the transmitting device in the BA frame.

With reference to the third aspect, in a first possible implementation manner, the generation unit includes: a determining module, configured to: for each of the at least one transmitting device, determine the length of the block acknowledgement bitmap field corresponding to the transmitting device, according to a difference between a largest sequence number and a smallest sequence number of a correctly received MPDU sent by the transmitting device; determine the block acknowledgement bitmap field corresponding to the transmitting device, according to the length of the block acknowledgement bitmap field corresponding to the transmitting device; and determine the bitmap length indicator corresponding to the transmitting device; and a generation module, configured to generate the BA frame according to the bitmap length indicator corresponding to each transmitting device and the block acknowledgement bitmap field corresponding to each transmitting device that are determined by the determining module.

With reference to the first possible implementation manner of the third aspect, in a second possible implementation manner, the determining module being configured to determine the length of the block acknowledgement bitmap field corresponding to the transmitting device is specifically: the determining module being configured to determine the length of the block acknowledgement bitmap field corresponding to the transmitting device, according to a difference between a largest sequence number and a smallest sequence number of a correctly received MPDU sent by the transmitting device.

With reference to the first possible implementation manner of the third aspect, in a third possible implementation manner, the determining module being configured to determine the length of the block acknowledgement bitmap field corresponding to the transmitting device is specifically: the determining module being configured to determine the length of the block acknowledgement bitmap field corresponding to the transmitting device, according to a difference between a largest sequence number of a correctly received MPDU sent by the transmitting device and a smallest sequence number of MPDUs that are not correctly received and that are sent by the transmitting device.

With reference to the third possible implementation manner of the third aspect, in a fourth possible implementation manner, the block acknowledgement starting sequence control field included in the BA information corresponding to the transmitting device includes a starting sequence number subfield, and a value of the starting sequence number subfield is set to the smallest sequence number of the MPDUs that are not correctly received and that are sent by the transmitting device, and represents that a sequence number corresponding to the first bit of the block acknowledgement bitmap field is the smallest sequence number and MPDUs corresponding to all sequence numbers preceding the smallest sequence number are correctly received.

With reference to any one of the third aspect or the foregoing possible implementation manners, in a fifth possible implementation manner, the receiving device further includes: a determining unit, configured to: before the generation unit generates the block acknowledgement BA frame according to the receiving status of the at least one MPDU in the at least one PPDU sent by each of the at least one transmitting device, for each of the at least one transmitting device, determine to set an acknowledgement indicator in a per traffic identifier TID information field included in the BA information corresponding to the transmitting device to a first value, where the first value represents that the BA information corresponding to the transmitting device includes the block acknowledgement starting sequence control field and the block acknowledgement bitmap field.

With reference to any one of the third aspect or the foregoing possible implementation manners, in a sixth possible implementation manner, the bitmap length indicator is carried in a fragment number subfield in the block acknowledgement starting sequence control field included in the BA information corresponding to the transmitting device in the BA frame.

With reference to any one of the first to fourth possible implementation manners of the third aspect, in a seventh possible implementation manner, the determining module being configured to determine the bitmap length indicator corresponding to the transmitting device is specifically: the determining module being configured to determine the bitmap length indicator corresponding to the transmitting device, according to the length of the block acknowledgement bitmap field corresponding to the transmitting device and a preset first mapping relationship, where the first mapping relationship is used to indicate a bitmap length indicator corresponding to a length of at least one block acknowledgement bitmap field.

With reference to the second possible implementation manner of the third aspect, in an eighth possible implementation manner, the determining module being configured to determine the length of the block acknowledgement bitmap field corresponding to the transmitting device, according to the difference between the largest sequence number and the smallest sequence number of the correctly received MPDU sent by the transmitting device is specifically: determine a quantity of MPDUs whose receiving statuses need to be fed back, according to the difference between the largest sequence number and the smallest sequence number of the correctly received MPDU sent by the transmitting device; determine a quantity of bytes required for feeding back whether an MPDU is correctly received, according to a largest fragment number of the correctly received MPDU sent by the transmitting device; and determine the length of the block acknowledgement bitmap field corresponding to the transmitting device, according to the quantity of MPDUs whose receiving statuses need to be fed back and the quantity of bytes required for feeding back whether an MPDU is correctly received.

With reference to the eighth possible implementation manner of the third aspect, in a ninth possible implementation manner, the determining module being configured to determine the bitmap length indicator corresponding to the transmitting device is specifically: the determining module being configured to: determine a quantity indicator corresponding to the transmitting device, according to the quantity of MPDUs whose receiving statuses need to be fed back and a preset second mapping relationship, where the quantity indicator is used to indicate the quantity of MPDUs whose receiving statuses need to be fed back, and the second mapping relationship is used to indicate a quantity indicator corresponding to a quantity of at least one MPDU whose receiving status needs to be fed back; determine a flag indicator corresponding to the transmitting device, according to the largest fragment number of the correctly received MPDU sent by the transmitting device, where the flag indicator is used to indicate the quantity of bytes required for feeding back whether an MPDU is correctly received; and combine the quantity indicator corresponding to the transmitting device and the flag indicator corresponding to the transmitting device, to generate the bitmap length indicator corresponding to the transmitting device.

A fourth aspect of the embodiments of the present invention provides a transmitting device. The transmitting device includes a sending unit, configured to send at least one physical layer convergence procedure Protocol Data Unit PPDU to a receiving device, where the PPDU includes at least one Medium Access Control Protocol Data Unit MPDU. The transmitting device also includes a receiving unit, configured to receive a block acknowledgement BA frame sent by the receiving device. The BA frame includes BA information corresponding to the transmitting device, the BA information includes a block acknowledgement bitmap field and a bitmap length indicator, the bitmap length indicator is used to indicate a length of the block acknowledgement bitmap field, and the bitmap length indicator is carried in a block acknowledgement starting sequence control field included in the BA information corresponding to the transmitting device in the BA frame.

With reference to the fourth aspect, in a first possible implementation manner, the length of the block acknowledgement bitmap field is determined by the receiving device according to a difference between a largest sequence number and a smallest sequence number of a correctly received MPDU sent by the transmitting device.

With reference to the fourth aspect, in a second possible implementation manner, the length of the block acknowledgement bitmap field is determined by the receiving device according to a difference between a largest sequence number of a correctly received MPDU sent by the transmitting device and a smallest sequence number of MPDUs that are not correctly received and that are sent by the transmitting device.

With reference to the second possible implementation manner of the fourth aspect, in a third possible implementation manner, the block acknowledgement starting sequence control field included in the BA information corresponding to the transmitting device includes a starting sequence number subfield, and a value of the starting sequence number subfield is set to the smallest sequence number of the MPDUs that are not correctly received and that are sent by the transmitting device, and represents that a sequence number corresponding to the first bit of the block acknowledgement bitmap field is the smallest sequence number and MPDUs corresponding to all sequence numbers preceding the smallest sequence number are correctly received.

With reference to the fourth aspect or the first possible implementation manner of the fourth aspect, in a fourth possible implementation manner, the bitmap length indicator is carried in a fragment number subfield in the block acknowledgement starting sequence control field included in the BA information corresponding to the transmitting device in the BA frame.

With reference to any one of the fourth aspect or the foregoing possible implementation manners, in a fifth possible implementation manner, the transmitting device further includes: a determining unit, configured to: after the receiving unit receives the block acknowledgement BA frame sent by the receiving device, determine the length of the block acknowledgement bitmap field included in the BA information corresponding to the transmitting device, according to the bitmap length indicator received by the receiving unit.

With reference to the fifth possible implementation manner of the fourth aspect, in a sixth possible implementation manner, the determining unit is specifically configured to: determine the length of the block acknowledgement bitmap field included in the BA information corresponding to the transmitting device, according to the bitmap length indicator and a preset first mapping relationship, where the first mapping relationship is used to indicate a length of a block acknowledgement bitmap field corresponding to at least one bitmap length indicator.

With reference to the fifth possible implementation manner of the fourth aspect, in a seventh possible implementation manner, the determining unit is specifically configured to: determine a quantity of MPDUs whose receiving statuses need to be fed back, according to a quantity indicator in the bitmap length indicator and a preset second mapping relationship, where the quantity indicator is used to indicate the quantity of MPDUs whose receiving statuses need to be fed back by the receiving device, and the second mapping relationship is used to indicate a quantity indicator corresponding to a quantity of at least one MPDU whose receiving status is fed back; determine a quantity of bytes required for feeding back whether an MPDU is correctly received, according to a flag indicator in the bitmap length indicator, where the flag indicator is used to indicate the quantity of bytes required by the receiving device to feed back whether an MPDU is correctly received; and determine the length of the block acknowledgement bitmap field included in the BA information corresponding to the transmitting device, according to the quantity of MPDUs whose receiving statuses need to be fed back and the quantity of bytes required for feeding back whether an MPDU is correctly received.

In the block acknowledgement frame transmission method and the device that are provided in the present invention, a receiving device receives at least one PPDU sent by at least one transmitting device, generates a BA frame according to a receiving status of at least one MPDU in the at least one PPDU sent by each of the at least one transmitting device, and sends the BA frame to each of the at least one transmitting device, where the BA frame includes BA information corresponding to each of the at least one transmitting device, the BA information includes a block acknowledgement bitmap field and a bitmap length indicator that is used to indicate a length of the block acknowledgement bitmap field, and the bitmap length indicator is carried in a block acknowledgement starting sequence control field included in the BA information corresponding to the transmitting device in the BA frame. The bitmap length indicator is used to indicate the length of the block acknowledgement bitmap field, so that the length of the block acknowledgement bitmap field in the BA information included in the BA frame does not need to be a fixed length of 64 bits, thereby resolving a resource waste problem caused by BA Bitmap field redundancy.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

An A-MPDU is a MAC layer aggregate transmission mechanism proposed in 802.11n. Before the mechanism is proposed, one PPDU includes only one MPDU. In the A-MPDU, a PPDU using an A-MPDU structure may include at least one MPDU, and the included MPDUs may belong to different frame types, or may have different source addresses (SA for short) or destination addresses (DA for short). However, all MPDUs included in one PPDU are sent to one receiving device, that is, have a same receiving address (RA for short). Compared with a conventional transmission manner (one PPDU includes only one MPDU), a transmission manner using the A-MPDU structure can reduce an inter frame space, channel contention time, and repeated transmission of a physical header during data transmission, thereby effectively improving the transmission efficiency.

As stipulated in 802.11n and 802.11ac, when receiving a PPDU using an A-MPDU structure, a receiving device needs to reply to a transmitting device with a BA frame, where the BA frame includes a BA Bitmap field, and each bit of the BA Bitmap field corresponds to one of all MPDUs whose receiving statuses need to be fed back. In addition, because a maximum of 64 MPDUs can be aggregated in one PPDU using the A-MPDU structure, it is stipulated in both 802.11n and 802.11ac that a length of the BA Bitmap field is always 64 bits.

Figure 1:
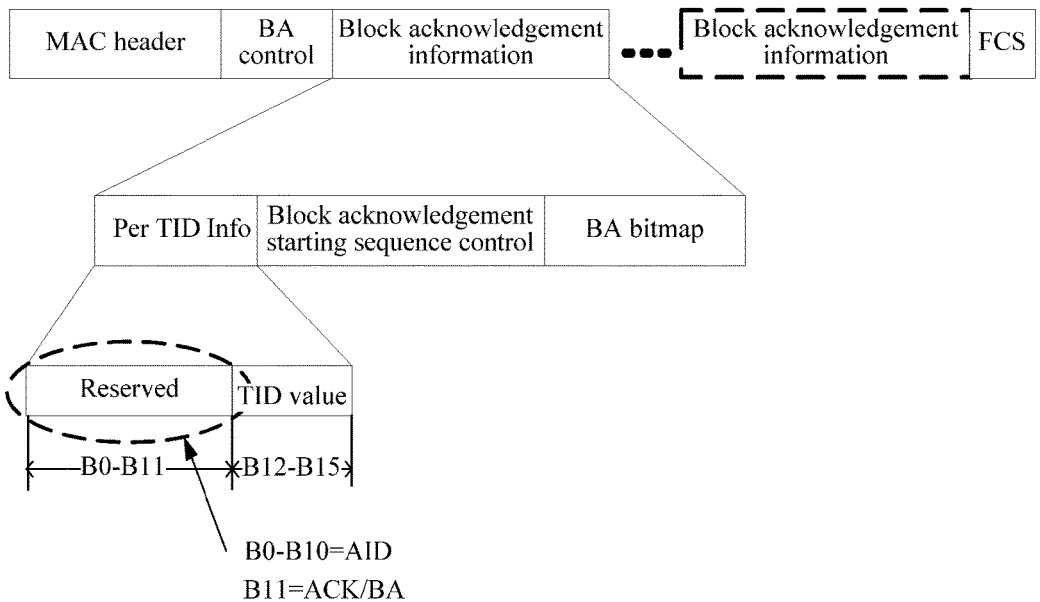
FIG. 1 is a schematic structural diagram of a multi STA BA frame in the prior art.

With development of communications technologies, standards applied to a communications system are continuously evolving. In a next-generation standard 802.11ax of 802.11ac, an uplink multiple user (UL MU for short) transmission mechanism has been introduced. The transmission mechanism includes a UL Orthogonal Frequency-Division Multiple Access (UL OFDMA for short) and a UL MU-multiple input multiple output (UL MU-MIMO for short). In this transmission mechanism, an access point (AP for short) may receive PPDUs from multiple stations (STA for short) at the same time. A PPDU of each STA uses an A-MPDU structure, that is, the PPDU of each STA includes at least one MPDU. As stipulated in the current standard, the AP needs to send a multi-STA BA frame to multiple STAs to reply with acknowledgement information. Specifically, as shown in FIG. 1, the multi-STA BA frame includes a MAC header (the MAC header may include a frame control field, a duration/identifier (Duration/ID) field, an RA field, a transmit address (TA for short) field), BA control, a frame check sequence (FCS for short), and at least one piece of BA Information (block acknowledgement information). Each piece of BA Information corresponds to one STA. For BA Information corresponding to a STA, the first ii bits (that is, B0 to B10) of the first field, that is, a per traffic identifier information (Per TID Info for short), of the BA Information is an association identifier (AID for short) of the STA.

In addition, to reduce transmission overheads, as shown in FIG. 1, the $12^{th}$ bit (that is, B11) of the Per TID Info field is an ACK (Acknowledgment)/BA indicator, and is used to indicate whether a block acknowledgement starting sequence control (Block Ack Starting Sequence Control) field and a BA Bitmap field exist after the Per TID Info field. Specifically, when the ACK/BA indicator is set to BA, the Block Ack Starting Sequence Control field and the BA Bitmap field exist after the Per TID Info field; or when the ACK/BA indicator is set to ACK, no Block Ack Starting Sequence Control field or BA Bitmap field exists after the Per TID Info field, that is, in this case, the BA Information may not include the Block Ack Starting Sequence Control field or the BA Bitmap field, and includes only the Per TID Info field. The ACK/BA indicator is set to ACK in the following two cases: case 1: A PPDU received by a receiving device from a STA includes only one MPDU and the MPDU is correctly received; case 2: A PPDU received by a receiving device from a STA includes at least two MPDUs and the at least two MPDUs are correctly received.

For a length of a BA Bitmap field, because a maximum of 64 MPDUs can be aggregated in a PPDU using an A-MPDU structure, it is stipulated in an existing standard that the length of the BA Bitmap field is always 64 bits. However, in actual application, a quantity of MPDUs aggregated in the PPDU using the A-MPDU structure is far less than 64. Therefore, a 64-bit BA Bitmap field may cause BA Bitmap field redundancy, resulting in resource waste. Especially, after the UL MU transmission mechanism is introduced, a BA frame (for example, a multi-STA BA frame, or a multi-TID BA frame) includes multiple BA Bitmap fields. Consequently, BA Bitmap field redundancy is accumulated, and resource waste becomes more severe. By means of the block acknowledgement frame transmission method provided in the present invention, a resource waste problem caused by BA Bitmap field redundancy can be well resolved.

It should be noted that the receiving device in the embodiments of the present invention may be an AP, and correspondingly, the transmitting device is a STA; or the receiving device may be a STA, and correspondingly, the transmitting device is an AP; or the receiving device may be a STA, and correspondingly, the transmitting device is also a STA. In short, the transmitting device and the receiving device both are devices supporting an 802.11 protocol.

One optional scenario is: Multiple STAs send UL data to an AP in a UL OFDMA or UL MU-MIMO manner, and the AP feeds back block acknowledgement BA messages to the multiple STAs according to receiving results. In this case, the transmitting device is the AP, and the receiving device is the STA.

To facilitate understanding by a person skilled in the art, the present invention describes, by using the following embodiments, a specific implementation process of the technical solutions provided in the present invention.

Figure 2:
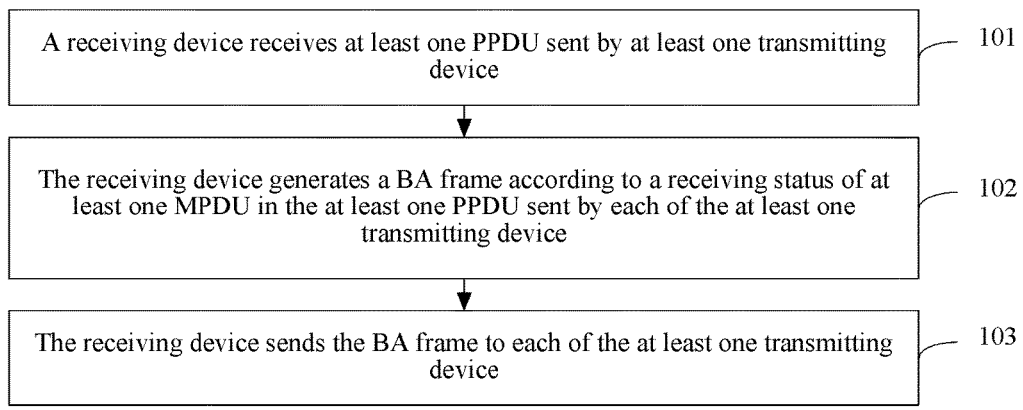
FIG. 2 is a flowchart of a block acknowledgement frame transmission method according to an embodiment of the present invention.

Another embodiment of the present invention provides a block acknowledgement frame transmission method. As shown in FIG. 2, the method may include the following steps.

101: A receiving device receives at least one PPDU sent by at least one transmitting device.

A PPDU sent by each transmitting device includes at least one MPDU.

It should be noted that the at least one transmitting device in this embodiment of the present invention includes a transmitting device that sends, to the receiving device, a PPDU including at least one MPDU correctly received by the receiving device; a transmitting device that sends, to the receiving device, a PPDU including no correctly received MPDU is not included in the at least one transmitting device.

It should be noted that the block acknowledgement frame transmission method provided in this embodiment of the present invention not only is applicable to a case in which a receiving device makes an acknowledgement reply for a received PPDU that is sent by at least one transmitting device and that uses an A-MPDU structure, but also is applicable to a case in which a transmitting device continuously sends multiple PPDUs (each PPDU usually includes one MPDU, and the transmitting device may send adjacent PPDUs to the receiving device at an interval of a fixed time, for example, the fixed time is a short inter frame space (SIFS for short)) to a receiving device, and sends a BA request (BAR for short) to the receiving device, to request the receiving device to make an acknowledgement reply. In the latter case, a BA frame is an acknowledgement reply for multiple PPDUs.

102: The receiving device generates a BA frame according to a receiving status of at least one MPDU in the at least one PPDU sent by each of the at least one transmitting device.

The BA frame includes BA information corresponding to each of the at least one transmitting device, the BA information includes a block acknowledgement bitmap field and a bitmap length indicator (Bitmap Length), the bitmap length indicator is used to indicate a length of the block acknowledgement bitmap field, and the bitmap length indicator is carried in a block acknowledgement starting sequence control field included in the BA information corresponding to the transmitting device in the BA frame.

Specifically, after receiving the at least one PPDU sent by each of the at least one transmitting device, the receiving device may generate the BA frame according to the receiving status of the at least one MPDU in the at least one PPDU sent by each of the at least one transmitting device.

103: The receiving device sends the BA frame to each of the at least one transmitting device.

After generating the BA frame according to the receiving status of the at least one MPDU in the at least one PPDU sent by each of the at least one transmitting device, the receiving device may send the BA frame to each of the at least one transmitting device.

In the block acknowledgement frame transmission method provided in the present invention, a receiving device receives at least one PPDU sent by at least one transmitting device, generates a BA frame according to a receiving status of at least one MPDU in the at least one PPDU sent by each of the at least one transmitting device, and sends the BA frame to each of the at least one transmitting device, where the BA frame includes BA information corresponding to each of the at least one transmitting device, the BA information includes a block acknowledgement bitmap field and a bitmap length indicator that is used to indicate a length of the block acknowledgement bitmap field, and the bitmap length indicator is carried in a block acknowledgement starting sequence control field included in the BA information corresponding to the transmitting device in the BA frame. The bitmap length indicator is used to indicate the length of the block acknowledgement bitmap field, so that the length of the block acknowledgement bitmap field in the BA information included in the BA frame does not need to be a fixed length of 64 bits, thereby resolving a resource waste problem caused by BA Bitmap field redundancy.

Further, in an embodiment of the present invention, step 102 may specifically include: for each of the at least one transmitting device, determining, by the receiving device, the length of the block acknowledgement bitmap field corresponding to the transmitting device, according to a difference between a largest sequence number and a smallest sequence number of a correctly received MPDU sent by the transmitting device; determining the block acknowledgement bitmap field corresponding to the transmitting device, according to the length of the block acknowledgement bitmap field corresponding to the transmitting device; and determining the bitmap length indicator corresponding to the transmitting device; and generating, by the receiving device, the BA frame according to the determined bitmap length indicator corresponding to each transmitting device and the determined block acknowledgement bitmap field corresponding to each transmitting device.

Further, in this embodiment of the present invention, if an acknowledgement indicator (for example, an ACK/BA indicator) is set in a per TID information field included in the BA information corresponding to the transmitting device, before the generating, by the receiving device in step 102, a BA frame according to a receiving status of at least one MPDU in the at least one PPDU sent by each of the at least one transmitting device, the block acknowledgement frame transmission method provided in this embodiment of the present invention may further include: for each of the at least one transmitting device, determining, by the receiving device, to set the acknowledgement indicator in the per TID information field included in the BA information corresponding to the transmitting device to a first value, where the first value represents that the BA information corresponding to the transmitting device includes the block acknowledgement starting sequence control field and the block acknowledgement bitmap field. The per TID information field is located before the block acknowledgement starting sequence control field and the block acknowledgement bitmap field.

The acknowledgement indicator may be an ACK/BA indicator, and a corresponding first value may be preset 0 or 1, to represent that the BA information includes the block acknowledgement starting sequence control field and the block acknowledgement bitmap field. For example, as stipulated in the protocol, when the ACK/BA indicator is 0, it represents that the BA information includes the block acknowledgement starting sequence control field and the block acknowledgement bitmap field, and when the ACK/BA indicator is 1, it represents that the BA information does not include the block acknowledgement starting sequence control field or the block acknowledgement bitmap field. In this case, the first value is 0. Alternatively, as stipulated in the protocol, when the ACK/BA indicator is 1, it represents that the BA information includes the block acknowledgement starting sequence control field and the block acknowledgement bitmap field, and when the ACK/BA indicator is 0, it represents that the BA information does not include the block acknowledgement starting sequence control field or the block acknowledgement bitmap field. In this case, the first value is 1.

Further, in an existing standard, a fragment number subfield in the block acknowledgement starting sequence control field is not used, and is always set to all 0s. Therefore, in this embodiment of the present invention, the bitmap length indicator is carried in a fragment number subfield in the block acknowledgement starting sequence control field included in the BA information corresponding to the transmitting device in the BA frame.

Preferably, three bits of the 4-bit Fragment Number subfield may be used to carry the bitmap length indicator corresponding to the transmitting device.

Certainly, all four bits of the Fragment Number subfield may be used to carry the bitmap length indicator corresponding to the transmitting device, to represent a smaller granularity.

Further, in this embodiment of the present invention, a value of a starting sequence number subfield in the block acknowledgement starting sequence control field is set to the smallest sequence number of the correctly received MPDU sent by the transmitting device.

Further, in this embodiment of the present invention, for example, in a first possible implementation manner, for a common BA frame, that is, an application scenario in which no fragment is used, when the Fragment Number subfield (three bits of all four bits) is used to carry the bitmap length indicator, because a length of the BA frame is in byte, a length of the BA Bitmap field should also be an integer multiple of a byte. Therefore, a specific process of determining the length of the block acknowledgement bitmap field according to the difference between the largest sequence number and the smallest sequence number of the correctly received MPDU sent by the transmitting device may be: first determining the difference between the largest sequence number and the smallest sequence number of the correctly received MPDU sent by the transmitting device, and substituting the difference into formula 1: $\lceil (x+1) \div 8 \rceil$ (x is the difference and $\lceil\ \rceil$ represents rounding up) to obtain a calculation result, where the calculation result is the length of the block acknowledgement bitmap field (a unit of the determined length of the block acknowledgement bitmap field is byte). For example, if the determined difference between the largest sequence number and the smallest sequence number of the correctly received MPDU sent by the transmitting device is 7, the length that is calculated according to formula 1 and that is of the block acknowledgement bitmap field is one byte. For another example, if the determined difference between the largest sequence number and the smallest sequence number of the correctly received MPDU sent by the transmitting device is 41, the length that is calculated according to formula 1 and that is of the block acknowledgement bitmap field is six bytes.

For example, in a second possible implementation manner, for a basic BA variant (Basic BlockAck variant) of a common BA frame, that is, an application scenario in which a fragment is used, when the Fragment Number subfield (all four bits) is used to carry the bitmap length indicator, because a maximum of 64 MPDUs are aggregated in a PPDU and one MPDU is allowed to be divided into a maximum of 16 fragments, a specific process of determining the length of the block acknowledgement bitmap field according to the difference between the largest sequence number and the smallest sequence number of the correctly received MPDU sent by the transmitting device may be: first determining the difference between the largest sequence number and the smallest sequence number of the correctly received MPDU sent by the transmitting device, and substituting the difference into formula 2: $2\times\lceil(x+1)\div4\rceil\times4$ (x is the difference and $\lceil\ \rceil$ represents rounding up) to obtain a calculation result, where the calculation result is the length of the block acknowledgement bitmap field (a unit of the determined length of the block acknowledgement bitmap field is byte). For example, if the determined difference between the largest sequence number and the smallest sequence number of the correctly received MPDU sent by the transmitting device is 7, the length that is calculated according to formula 2 and that is of the block acknowledgement bitmap field is 16 bytes. For another example, if the determined difference between the largest sequence number and the smallest sequence number of the correctly received MPDU sent by the transmitting device is 41, the length that is calculated according to formula 2 and that is of the block acknowledgement bitmap field is 88 bytes.

It should be noted that, in the scenario in which the fragment is used, the receiving device receives multiple fragments of an MPDU, and when at least one fragment of the fragments is correctly received, it is considered that the MPDU needs to be acknowledged, and a sequence number of the MPDU is considered during determining of the largest sequence number and the smallest sequence number. That is, in the scenario in which the fragment is used, "the correctly received MPDU sent by the transmitting device" refers to an MPDU at least one fragment of which is correctly received.

Further, in this embodiment of the present invention, when the length of the block acknowledgement bitmap field is determined by using the first or second implementation manner, the determining the bitmap length indicator corresponding to the transmitting device may specifically include: determining, by the receiving device, the bitmap length indicator corresponding to the transmitting device, according to the length of the block acknowledgement bitmap field corresponding to the transmitting device and a preset first mapping relationship. The first mapping relationship is used to indicate a bitmap length indicator corresponding to a length of at least one block acknowledgement bitmap field.

Further, in this embodiment of the present invention, in a third possible implementation manner, for a basic BA variant of a common BA frame, that is, an application scenario in which a fragment is used, when the Fragment Number subfield (all four bits) is used to carry the bitmap length indicator, because a maximum of 64 MPDUs are aggregated in a PPDU, and one MDPU is allowed to be divided into a maximum of 16 fragments, the determining the length of the block acknowledgement bitmap field corresponding to the transmitting device, according to a difference between a largest sequence number and a smallest sequence number of a correctly received MPDU sent by the transmitting device may specifically include the following substeps.

The receiving device determines a quantity of MPDUs whose receiving statuses need to be fed back, according to the difference between the largest sequence number and the smallest sequence number of the correctly received MPDU sent by the transmitting device.

The determining a quantity of MPDUs whose receiving statuses need to be fed back may be specifically: first calculating the difference between the largest sequence number and the smallest sequence number of the correctly received MPDU sent by the transmitting device, and substituting the difference into formula 3: $\lceil(x+1)\div8\rceil\times8$ to obtain a calculation result, where the calculation result is the quantity of MPDUs whose receiving statuses need to be fed back. For example, if the difference between the largest sequence number and the smallest sequence number of the correctly received MPDU sent by the transmitting device is 19, the quantity that is calculated according to formula 3 and that is of MPDUs whose receiving statuses need to be fed back is 24.

The receiving device determines a quantity of bytes required for feeding back whether an MPDU is correctly received, according to a largest fragment number of the correctly received MPDU sent by the transmitting device.

If the receiving device determines that a largest fragment number of a correctly received fragment of at least one MPDU in all correctly received MPDUs sent by the transmitting device is greater than or equal to 8, the receiving device determines that the quantity of bytes required for feeding back whether an MPDU is correctly received is two bytes (16 bits). A value range of a fragment number is 0 to 15. If the receiving device determines that largest fragment numbers of correctly received fragments of all correctly received MPDUs sent by the transmitting device are all less than 8, the receiving device determines that the quantity of bytes required for feeding back whether an MPDU is correctly received is one byte (eight bits). For example, an MPDU includes 12 fragments, but the receiving device correctly receives only five fragments. If the correctly received fragments are fragments numbered 1, 2, 4, 5, and 6, a largest fragment number is 6, which is less than 8. In this case, the determined quantity of bytes required for feeding back whether an MPDU is correctly received is one byte. If the correctly received fragments are fragments numbered 1, 3, 5, 8, and 11, a largest fragment number is 11, which is greater than 8. In this case, the determined quantity of bytes required for feeding back whether an MPDU is correctly received is two bytes.

The receiving device determines the length of the block acknowledgement bitmap field corresponding to the transmitting device, according to the quantity of MPDUs whose receiving statuses need to be fed back and the quantity of bytes required for feeding back whether an MPDU is correctly received.

The quantity of MPDUs whose receiving statuses need to be fed back and the quantity of bytes required for feeding back whether an MPDU is correctly received are substituted into formula 4: $A\times B$ (A represents the quantity of MPDUs whose receiving statuses need to be fed back, A is calculated according to formula 3, and B represents the quantity of bytes required for feeding back whether an MPDU is correctly received) to obtain a calculation result, where the calculation result is the length of the block acknowledgement bitmap field (a unit of the determined length of the block acknowledgement bitmap field is byte). For example, if the quantity of MPDUs whose receiving statuses need to be fed back is A=24, and the quantity of bytes required for feeding back whether an MPDU is correctly received is B=2, the length that is calculated according to formula 4 and that is of the block acknowledgement bitmap field is 48 bytes.

Further, in this embodiment of the present invention, when the length of the block acknowledgement bitmap field is determined by using the third implementation manner, the determining the bitmap length indicator corresponding to the transmitting device may specifically include: determining, by the receiving device, a quantity indicator corresponding to the transmitting device, according to the quantity of MPDUs whose receiving statuses need to be fed back and a preset second mapping relationship, where the quantity indicator is used to indicate the quantity of MPDUs whose receiving statuses need to be fed back, and the second mapping relationship is used to indicate a quantity indicator corresponding to a quantity of at least one MPDU whose receiving status needs to be fed back; determining, by the receiving device, a flag indicator corresponding to the transmitting device, according to the largest fragment number of the correctly received MPDU sent by the transmitting device, where the flag indicator is used to indicate the quantity of bytes required for feeding back whether an MPDU is correctly received; and combining, by the receiving device, the quantity indicator corresponding to the transmitting device and the flag indicator corresponding to the transmitting device, to generate the bitmap length indicator corresponding to the transmitting device.

In another embodiment of the present invention, step 102 may specifically include: for each of the at least one transmitting device, determining, by the receiving device, the length of the block acknowledgement bitmap field corresponding to the transmitting device, according to a difference between a largest sequence number of a correctly received MPDU sent by the transmitting device and a smallest sequence number of MPDUs that are not correctly received and that are sent by the transmitting device; then, similar to the previous embodiment, determining the block acknowledgement bitmap field corresponding to the transmitting device, according to the length of the block acknowledgement bitmap field corresponding to the transmitting device, and determining the bitmap length indicator corresponding to the transmitting device; and generating, by the receiving device, the BA frame according to the determined bitmap length indicator corresponding to each transmitting device and the determined block acknowledgement bitmap field corresponding to each transmitting device.

Further, in this embodiment of the present invention, if an acknowledgement indicator (for example, an ACK/BA indicator) is set in a per TID information field included in the BA information corresponding to the transmitting device, before the generating, by the receiving device in step 102, a BA frame according to a receiving status of at least one MPDU in the at least one PPDU sent by each of the at least one transmitting device, the block acknowledgement frame transmission method provided in this embodiment of the present invention may further include: for each of the at least one transmitting device, determining, by the receiving device, to set the acknowledgement indicator in the per TID information field included in the BA information corresponding to the transmitting device to a first value, where the first value represents that the BA information corresponding to the transmitting device includes the block acknowledgement starting sequence control field and the block acknowledgement bitmap field. The per TID information field is located before the block acknowledgement starting sequence control field and the block acknowledgement bitmap field.

The acknowledgement indicator may be an ACK/BA indicator, and a corresponding first value may be preset 0 or 1, to represent that the BA information includes the block acknowledgement starting sequence control field and the block acknowledgement bitmap field. For example, as stipulated in the protocol, when the ACK/BA indicator is 0, it represents that the BA information includes the block acknowledgement starting sequence control field and the block acknowledgement bitmap field, and when the ACK/BA indicator is 1, it represents that the BA information does not include the block acknowledgement starting sequence control field or the block acknowledgement bitmap field. In this case, the first value is 0. Alternatively, as stipulated in the protocol, when the ACK/BA indicator is 1, it represents that the BA information includes the block acknowledgement starting sequence control field and the block acknowledgement bitmap field, and when the ACK/BA indicator is 0, it represents that the BA information does not include the block acknowledgement starting sequence control field or the block acknowledgement bitmap field. In this case, the first value is 1.

Further, in an existing standard, a fragment number subfield in the block acknowledgement starting sequence control field is not used, and is always set to all 0s. Therefore, in this embodiment of the present invention, the bitmap length indicator is carried in a fragment number (Fragment Number) subfield in the block acknowledgement starting sequence control field included in the BA information corresponding to the transmitting device in the BA frame.

Preferably, three bits of the 4-bit Fragment Number subfield may be used to carry the bitmap length indicator corresponding to the transmitting device.

Certainly, all four bits of the Fragment Number subfield may be used to carry the bitmap length indicator corresponding to the transmitting device, to represent a smaller granularity.

Further, in this embodiment of the present invention, the block acknowledgement starting sequence control field included in the BA information corresponding to the transmitting device includes a starting sequence number subfield, and a value of the starting sequence number subfield is set to the smallest sequence number of the MPDUs that are not correctly received and that are sent by the transmitting device, and represents that a sequence number corresponding to the first bit of the block acknowledgement bitmap field is the smallest sequence number and MPDUs corresponding to all sequence numbers preceding the smallest sequence number are correctly received. That is, MPDUs corresponding to sequence numbers less than the smallest sequence number are correctly received by the receiving device.

Further, in this embodiment of the present invention, for example, in a first possible implementation manner, for a common BA frame, that is, an application scenario in which no fragment is used, when the Fragment Number subfield (three bits of all four bits) is used to carry the bitmap length indicator, because a length of the BA frame is in byte, a length of the BA Bitmap field should also be an integer multiple of a byte. Therefore, a specific process of determining the length of the block acknowledgement bitmap field corresponding to the transmitting device, according to the difference between the largest sequence number of the correctly received MPDU sent by the transmitting device and the smallest sequence number of the MPDUs that are not correctly received and that are sent by the transmitting device may be: first determining the largest sequence number u of the correctly received MPDU sent by the transmitting device and the smallest sequence number v of the MPDUs that are not correctly received and that are sent by the transmitting device, and substituting the largest sequence number and the smallest sequence number into formula 1: $\lceil(|u-v|+1)\div 8\rceil$ (u is the largest sequence number of the correctly received MPDU sent by the transmitting device, v is the smallest sequence number of the MPDUs that are not correctly received and that are sent by the transmitting device, $\lceil\ \rceil$ represents rounding up, and $\|$ represents obtaining an absolute value) to obtain a calculation result, where the calculation result is the length of the block acknowledgement bitmap field (a unit of the determined length of the block acknowledgement bitmap field is byte). In addition, a starting sequence number subfield in the block acknowledgement starting sequence control field should be set to the smallest sequence number v of the MPDUs that are not correctly received and that are sent by the transmitting device, to represent that a sequence number corresponding to the first bit of the block acknowledgement bitmap field is the value and MPDUs corresponding to all sequence numbers preceding the sequence number are correctly received. For example, a range of a sequence number of an MPDU sent by the transmitting device is 10 to 50. If the receiving device correctly receives all MPDUs except an MPDU corresponding to a sequence number 32, u=50, v=32, and $\lceil(|u-v|+1)\div 8\rceil=3$, that is, the length of the block acknowledgement bitmap field is three bytes, and in this case, a corresponding starting sequence number is set to 32, to represent that MPDUs corresponding to sequence numbers less than 32 are all correctly received. If the receiving device correctly receives all MPDUs except an MPDU corresponding to a sequence number 10, u=50, v=10, and $\lceil(|u-v|+1)\div 8\rceil=6$, that is, the length of the block acknowledgement bitmap field is six bytes, and in this case, a corresponding starting sequence number is set to 10, to represent that MPDUs corresponding to sequence numbers less than 10 are all correctly received. If the receiving device correctly receives all MPDUs except MPDUs corresponding to sequence numbers 45 to 50, u=44, v=45, and $\lceil(|u-v|+1)\div 8\rceil=1$, that is, the length of the block acknowledgement bitmap field is one byte, and in this case, a corresponding starting sequence number is set to 45, to represent that MPDUs corresponding to sequence numbers less than 45 are all correctly received, and in this case, all bits of the block acknowledgement bitmap field are 0. If the receiving device correctly receives all MPDUs except an MPDU corresponding to a sequence number 47, u=50, v=47, and $\lceil(|u-v|+1)\div 8\rceil=1$, that is, the length of the block acknowledgement bitmap field is one byte, and in this case, a corresponding starting sequence number is set to 47, to represent that MPDUs corresponding to sequence numbers less than 47 are all correctly received, and in this case, values of bits of the block acknowledgement bitmap field are 01110000.

For example, in a second possible implementation manner, for a basic BA variant (Basic BlockAck variant) of a common BA frame, that is, an application scenario in which a fragment is used, when the Fragment Number subfield (all four bits) is used to carry the bitmap length indicator, because a maximum of 64 MPDUs are aggregated in a PPDU and one MPDU is allowed to be divided into a maximum of 16 fragments, a specific process of determining the length of the block acknowledgement bitmap field corresponding to the transmitting device, according to the difference between the largest sequence number of the correctly received MPDU sent by the transmitting device and the smallest sequence number of the MPDUs that are not correctly received and that are sent by the transmitting device may be: first determining the largest sequence number u of the correctly received MPDU sent by the transmitting device and the smallest sequence number v of the MPDUs that are not correctly received and that are sent by the transmitting device, and substituting the largest sequence number and the smallest sequence number into formula 2: $2\times\lceil(|u-v|+1)\div 4\rceil\times 4$ (u is the largest sequence number of the correctly received MPDU sent by the transmitting device, v is the smallest sequence number of the MPDUs that are not correctly received and that are sent by the transmitting device, $\lceil\ \rceil$ represents rounding up, and $\|$ represents obtaining an absolute value) to obtain a calculation result, where the calculation result is the length of the block acknowledgement bitmap field (a unit of the determined length of the block acknowledgement bitmap field is byte). In addition, a starting sequence number subfield in the block acknowledgement starting sequence control field should be set to the smallest sequence number v of the MPDUs that are not correctly received and that are sent by the transmitting device, to represent that a sequence number corresponding to the first bit of the block acknowledgement bitmap field is the value and MPDUs corresponding to all sequence numbers preceding the sequence number are correctly received. For example, a range of a sequence number of an MPDU sent by the transmitting device is 10 to 50. If the receiving device correctly receives all MPDUs except an MPDU corresponding to a sequence number 32, u=50, v=32, and $2\times\lceil(|u-v|+1)\div 4\rceil\times 4=40$, that is, the length of the block acknowledgement bitmap field is 40 bytes, and in this case, a corresponding starting sequence number is set to 32, to represent that all fragments of MPDUs corresponding to sequence numbers less than 32 are correctly received. If the receiving device correctly receives all MPDUs except an MPDU corresponding to a sequence number 10, u=50, v=10, and $2\times\lceil(|u-v|+1)\div 4\rceil\times 4=88$, that is, the length of the block acknowledgement bitmap field is 88 bytes, and in this case, a corresponding starting sequence number is set to 10, to represent that all fragments of MPDUs corresponding to sequence numbers less than 10 are correctly received. If the receiving device correctly receives all MPDUs except MPDUs corresponding to sequence numbers 45 to 50, u=44, v=45, and $2\times\lceil(|u-v|+1)\div 4\rceil\times 4=8$, that is, the length of the block acknowledgement bitmap field is eight bytes, and in this case, a corresponding starting sequence number is set to 45, to represent that all fragments of MPDUs corresponding to sequence numbers less than 45 are correctly received. If the receiving device correctly receives all MPDUs except an MPDU corresponding to a sequence number 47, u=50, v=47, and $2\times\lceil(|u-v|+1)\div 4\rceil\times 4=8$, that is, the length of the block acknowledgement bitmap field is 8 bytes, and in this case, a corresponding starting sequence number is set to 47, to represent that all fragments of MPDUs corresponding to sequence numbers less than 47 are correctly received, and in this case, values of bits of the block acknowledgement bitmap field are 01110000.

It should be noted that, in the scenario in which the fragment is used, the receiving device receives multiple fragments of an MPDU. "The correctly received MPDU sent by the transmitting device" refers to an MPDU all fragments of which are correctly received. "The MPDU that is not correctly received and that is sent by the transmitting device" refers to an MPDU at least one fragment of which is not correctly received. Likewise, when an MPDU is incorrectly received, at least one fragment of the MPDU is incorrectly received, and when an MPDU is correctly received, all fragments included in the MPDU are correctly received.

Further, in this embodiment of the present invention, when the length of the block acknowledgement bitmap field is determined by using the first or second implementation manner, the determining the bitmap length indicator corresponding to the transmitting device may specifically include: determining, by the receiving device, the bitmap length indicator corresponding to the transmitting device, according to the length of the block acknowledgement bitmap field corresponding to the transmitting device and a preset first mapping relationship. The first mapping relationship is used to indicate a bitmap length indicator corresponding to a length of at least one block acknowledgement bitmap field.

Further, in this embodiment of the present invention, in a third possible implementation manner, for a basic BA variant of a common BA frame, that is, an application scenario in which a fragment is used, when the Fragment Number subfield (all four bits) is used to carry the bitmap length indicator, because a maximum of 64 MPDUs are aggregated in a PPDU, and one MDPU is allowed to be divided into a maximum of 16 fragments, the determining the length of the block acknowledgement bitmap field corresponding to the transmitting device, according to a difference between a largest sequence number of a correctly received MPDU sent by the transmitting device and a smallest sequence number of MPDUs that are not correctly received and that are sent by the transmitting device may specifically include the following substeps.

The receiving device determines a quantity of MPDUs whose receiving statuses need to be fed back, according to the difference between the largest sequence number of the correctly received MPDU sent by the transmitting device and the smallest sequence number of the MPDUs that are not correctly received and that are sent by the transmitting device.

The determining a quantity of MPDUs whose receiving statuses need to be fed back may be specifically: first determining the largest sequence number u of the correctly received MPDU sent by the transmitting device and the smallest sequence number v of the MPDUs that are not correctly received and that are sent by the transmitting device, and substituting the largest sequence number and the smallest sequence number into formula 3: $A=|u-v|+1$ (u is the largest sequence number of the correctly received MPDU sent by the transmitting device, v is the smallest sequence number of the MPDUs that are not correctly received and that are sent by the transmitting device, $\lceil\ \rceil$ represents rounding up, and $||$ represents obtaining an absolute value) to obtain a calculation result, where the calculation result is the quantity of MPDUs whose receiving statuses need to be fed back. For example, a range of a sequence number of an MPDU sent by the transmitting device is 10 to 50. If the receiving device correctly receives all MPDUs except an MPDU corresponding to a sequence number 32, $u=50$, $v=32$, and $A=|u-v|+1=19$, that is, the quantity of MPDUs whose receiving statuses need to be fed back is 19. If the receiving device correctly receives all MPDUs except an MPDU corresponding to a sequence number 10, $u=50$, $v=10$, and $A=|u-v|+1=41$, that is, the quantity of MPDUs whose receiving statuses need to be fed back is 41. If the receiving device correctly receives all MPDUs except MPDUs corresponding to sequence numbers 45 to 50, $u=44$, $v=45$, and $A=|u-v|+1=2$, that is, the quantity of MPDUs whose receiving statuses need to be fed back is 2. If the receiving device correctly receives all MPDUs except an MPDU corresponding to a sequence number 47, $u=50$, $v=47$, and $A=|u-v|+1=4$, that is, the quantity of MPDUs whose receiving statuses need to be fed back is 4.

The receiving device determines a quantity of bytes required for feeding back whether an MPDU is correctly received, according to a largest fragment number of the correctly received MPDU sent by the transmitting device.

If the receiving device determines that a largest fragment number of a correctly received fragment of at least one MPDU in all correctly received MPDUs sent by the transmitting device is greater than or equal to 8, the receiving device determines that the quantity of bytes required for feeding back whether an MPDU is correctly received is two bytes (16 bits). A value range of a fragment number is 0 to 15. If the receiving device determines that largest fragment numbers of correctly received fragments of all correctly received MPDUs sent by the transmitting device are all less than 8, the receiving device determines that the quantity of bytes required for feeding back whether an MPDU is correctly received is one byte (eight bits). For example, an MPDU includes 12 fragments, but the receiving device correctly receives only five fragments. If the correctly received fragments are fragments numbered 1, 2, 4, 5, and 6, a largest fragment number is 6, which is less than 8. In this case, the determined quantity of bytes required for feeding back whether an MPDU is correctly received is one byte. If the correctly received fragments are fragments numbered 1, 3, 5, 8, and 11, a largest fragment number is 11, which is greater than 8. In this case, the determined quantity of bytes required for feeding back whether an MPDU is correctly received is two bytes.

The receiving device determines the length of the block acknowledgement bitmap field corresponding to the transmitting device, according to the quantity of MPDUs whose receiving statuses need to be fed back and the quantity of bytes required for feeding back whether an MPDU is correctly received.

The quantity of MPDUs whose receiving statuses need to be fed back and the quantity of bytes required for feeding back whether an MPDU is correctly received are substituted into formula 4: $A \times B$ (A represents the quantity of MPDUs whose receiving statuses need to be fed back, A is calculated according to formula 3, and B represents the quantity of bytes required for feeding back whether an MPDU is correctly received) to obtain a calculation result, where the calculation result is the length of the block acknowledgement bitmap field (a unit of the determined length of the block acknowledgement bitmap field is byte). In addition, a starting sequence number subfield in the block acknowledgement starting sequence control field should be set to the smallest sequence number v of the MPDUs that are not correctly received and that are sent by the transmitting device, to represent that a sequence number corresponding to the first bit of the block acknowledgement bitmap field is the value and MPDUs corresponding to all sequence numbers preceding the sequence number are correctly received. For example, if the quantity of MPDUs whose receiving statuses need to be fed back is $A=24$, and the quantity of bytes required for feeding back whether an MPDU is correctly received is $B=2$, the length that is calculated according to formula 4 and that is of the block acknowledgement bitmap field is 48 bytes. For another example, a range of a sequence number of an MPDU sent by the transmitting device is 10 to 50. If the receiving device correctly receives all MPDUs except an MPDU corresponding to a sequence number 32, u=50, v=32, A=|u−v|+1=19, and B=2, that is, the length that is calculated according to formula 4 and that is of the block acknowledgement bitmap field is 38. In addition, a corresponding starting sequence number should be set to v=32, to represent that all fragments of MPDUs corresponding to sequence numbers less than 32 are correctly received.

It should be noted that, in the scenario in which the fragment is used, the receiving device receives multiple fragments of an MPDU. "The correctly received MPDU sent by the transmitting device" refers to an MPDU all fragments of which are correctly received. "The MPDU that is not correctly received and that is sent by the transmitting device" refers to an MPDU at least one fragment of which is not correctly received. Likewise, when an MPDU is incorrectly received, at least one fragment of the MPDU is incorrectly received, and when an MPDU is correctly received, all fragments included in the MPDU are correctly received.

Further, in this embodiment of the present invention, when the length of the block acknowledgement bitmap field is determined by using the third implementation manner, the determining the bitmap length indicator corresponding to the transmitting device may specifically include: determining, by the receiving device, a quantity indicator corresponding to the transmitting device, according to the quantity of MPDUs whose receiving statuses need to be fed back and a preset second mapping relationship, where the quantity indicator is used to indicate the quantity of MPDUs whose receiving statuses need to be fed back, and the second mapping relationship is used to indicate a quantity indicator corresponding to a quantity of at least one MPDU whose receiving status needs to be fed back; determining, by the receiving device, a flag indicator corresponding to the transmitting device, according to the largest fragment number of the correctly received MPDU sent by the transmitting device, where the flag indicator is used to indicate the quantity of bytes required for feeding back whether an MPDU is correctly received; and combining, by the receiving device, the quantity indicator corresponding to the transmitting device and the flag indicator corresponding to the transmitting device, to generate the bitmap length indicator corresponding to the transmitting device.

The foregoing two embodiments provide two methods for determining the length of the block acknowledgement bitmap field corresponding to the transmitting device:

Method 1: The receiving device determines the length of the block acknowledgement bitmap field corresponding to the transmitting device, according to the difference between the largest sequence number and the smallest sequence number of the correctly received MPDU sent by the transmitting device.

Method 2: The receiving device determines the length of the block acknowledgement bitmap field corresponding to the transmitting device, according to the difference between the largest sequence number of the correctly received MPDU sent by the transmitting device and the smallest sequence number of the MPDUs that are not correctly received and that are sent by the transmitting device.

In some cases, the length that is determined by the receiving device by using method 1 and that is of the block acknowledgement bitmap field is smaller, and in some other cases, the length that is determined by the receiving device by using method 2 and that is of the block acknowledgement bitmap field is smaller. For example, an A-MPDU sent by a transmit end includes 64 MPDUs whose sequence numbers are 1 to 64. If MPDUs whose sequence numbers are 1 to 32 are incorrectly received, and the other MPDUs are correctly received, the length that is determined by using method 1 and that is of the block acknowledgement bitmap field is 32 bits, and the length that is determined by using method 2 and that is of the block acknowledgement bitmap field is 64 bits. Therefore, apparently, overheads of method 1 are less. If MPDUs whose sequence numbers are 33 to 40 are incorrectly received, and the other MPDUs are correctly received, the length that is determined by using method 1 and that is of the block acknowledgement bitmap field is 64 bits, and the length that is determined by using method 2 and that is of the block acknowledgement bitmap field is 32 bits. Therefore, apparently, overheads of method 2 are less.

Therefore, a receive end may determine, according to a receiving status, a method to be used. Specifically, the receiving device introduces first indication information in the BA frame, to indicate the method used for determining the length of the block acknowledgement bitmap field in the BA frame. For example, when the first indication information is 0, it represents that method 1 is used to determine the length of the block acknowledgement bitmap field, and when the first indication information is 1, it represents that method 2 is used to determine the length of the block acknowledgement bitmap field. Certainly, a specific meaning of the first indication information may be equivalent to a meaning that indicates a starting sequence number subfield. For example, when the first indication information is 0, it represents that the starting sequence number subfield carries a smallest sequence number of an MPDU correctly received by the receiving device, and when the first indication information is 1, it represents that the starting sequence number subfield carries a smallest sequence number of MPDUs that are not correctly received by the receiving device.

Specifically, the first indication information may be located in a BA control field in the BA frame, to represent that all BA Info in the current BA frame uses the method indicated in the first indication information.

Optionally, the first indication information may be located in each piece of BA Info in the BA frame, to indicate the method, used in the current BA Info, for determining the length of the block acknowledgement bitmap field. Specifically, the first indication information may be located in a Fragment Number subfield in a block acknowledgement starting sequence control field included in the BA Info.

Figure 3:
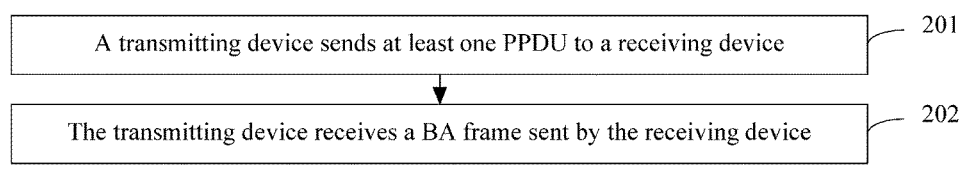
FIG. 3 is a flowchart of a block acknowledgement frame transmission method according to another embodiment of the present invention.

Another embodiment of the present invention provides a block acknowledgement frame transmission method. As shown in FIG. 3, the method may include the following steps.

201: A transmitting device sends at least one PPDU to a receiving device.

The PPDU sent by the transmitting device includes at least one MPDU.

202: The transmitting device receives a BA frame sent by the receiving device.

The BA frame includes BA information corresponding to the transmitting device, the BA information includes a block acknowledgement bitmap field and a bitmap length indicator, the bitmap length indicator is used to indicate a length of the block acknowledgement bitmap field, and the bitmap length indicator is carried in a block acknowledgement starting sequence control field included in the BA information corresponding to the transmitting device in the BA frame.

It should be noted that the block acknowledgement frame transmission method provided in this embodiment of the present invention not only is applicable to a case in which a receiving device makes an acknowledgement reply for a received PPDU that is sent by at least one transmitting device and that uses an A-MPDU structure, but also is applicable to a case in which a transmitting device continuously sends multiple PPDUs (each PPDU usually includes one MPDU, and the transmitting device may send adjacent PPDUs to the receiving device at a fixed time interval of a fixed time, for example, the fixed time is an SIFS) to a receiving device, and sends a BAR to the receiving device, to request the receiving device to make an acknowledgement reply. In the latter case, a BA frame is an acknowledgement reply for multiple PPDUs.

In the block acknowledgement frame transmission method provided in the present invention, a transmitting device sends at least one PPDU including at least one MPDU to a receiving device, and receives a BA frame sent by the receiving device, where the BA frame includes BA information corresponding to the transmitting device, the BA information includes a block acknowledgement bitmap field and a bitmap length indicator that is used to indicate a length of the block acknowledgement bitmap field, and the bitmap length indicator is carried in a block acknowledgement starting sequence control field included in the BA information corresponding to the transmitting device in the BA frame. The receiving device uses the bitmap length indicator to indicate the length of the block acknowledgement bitmap field, so that the length of the block acknowledgement bitmap field in the BA information included in the BA frame does not need to be a fixed length of 64 bits, thereby resolving a resource waste problem caused by BA Bitmap field redundancy.

Further, in this embodiment of the present invention, the length of the block acknowledgement bitmap field is determined by the receiving device according to a difference between a largest sequence number and a smallest sequence number of a correctly received MPDU sent by the transmitting device.

Further, in an existing standard, a fragment number subfield in the block acknowledgement starting sequence control field is not used, and is always set to all 0s. Therefore, in this embodiment of the present invention, the bitmap length indicator is carried in a fragment number subfield in the block acknowledgement starting sequence control field included in the BA information corresponding to the transmitting device in the BA frame.

Preferably, three bits of the 4-bit Fragment Number subfield may be used to carry the bitmap length indicator corresponding to the transmitting device.

Certainly, all four bits of the Fragment Number subfield may be used to carry the bitmap length indicator corresponding to the transmitting device, to represent a smaller granularity.

Further, in this embodiment of the present invention, after the receiving, by the transmitting device, a BA frame sent by the receiving device in step 202, the block acknowledgement frame transmission method provided in this embodiment of the present invention may further include: determining, by the transmitting device, the length of the block acknowledgement bitmap field included in the BA information corresponding to the transmitting device, according to the bitmap length indicator.

Further, in this embodiment of the present invention, when the receiving device determines the length of the block acknowledgement bitmap field by using the first or second implementation manner in the foregoing embodiment, the determining, by the transmitting device, the length of the block acknowledgement bitmap field included in the BA information corresponding to the transmitting device, according to the bitmap length indicator may specifically include: determining, by the transmitting device, the length of the block acknowledgement bitmap field included in the BA information corresponding to the transmitting device, according to the bitmap length indicator and a preset first mapping relationship, where the first mapping relationship is used to indicate a length of a block acknowledgement bitmap field corresponding to at least one bitmap length indicator.

Further, when the receiving device determines the length of the block acknowledgement bitmap field by using the third implementation manner in the foregoing embodiment, in this embodiment of the present invention, the determining, by the transmitting device, the length of the block acknowledgement bitmap field included in the BA information corresponding to the transmitting device, according to the bitmap length indicator may specifically include: determining, by the transmitting device, a quantity of MPDUs whose receiving statuses need to be fed back, according to a quantity indicator in the bitmap length indicator and a preset second mapping relationship, where the quantity indicator is used to indicate the quantity of MPDUs whose receiving statuses need to be fed back by the receiving device, and the second mapping relationship is used to indicate a quantity indicator corresponding to a quantity of at least one MPDU whose receiving status is fed back; determining, by the transmitting device, a quantity of bytes required for feeding back whether an MPDU is correctly received, according to a flag indicator in the bitmap length indicator, where the flag indicator is used to indicate the quantity of bytes required by the receiving device to feed back whether an MPDU is correctly received; and determining, by the transmitting device, the length of the block acknowledgement bitmap field included in the BA information corresponding to the transmitting device, according to the quantity of MPDUs whose receiving statuses need to be fed back and the quantity of bytes required for feeding back whether an MPDU is correctly received.

Figure 4:
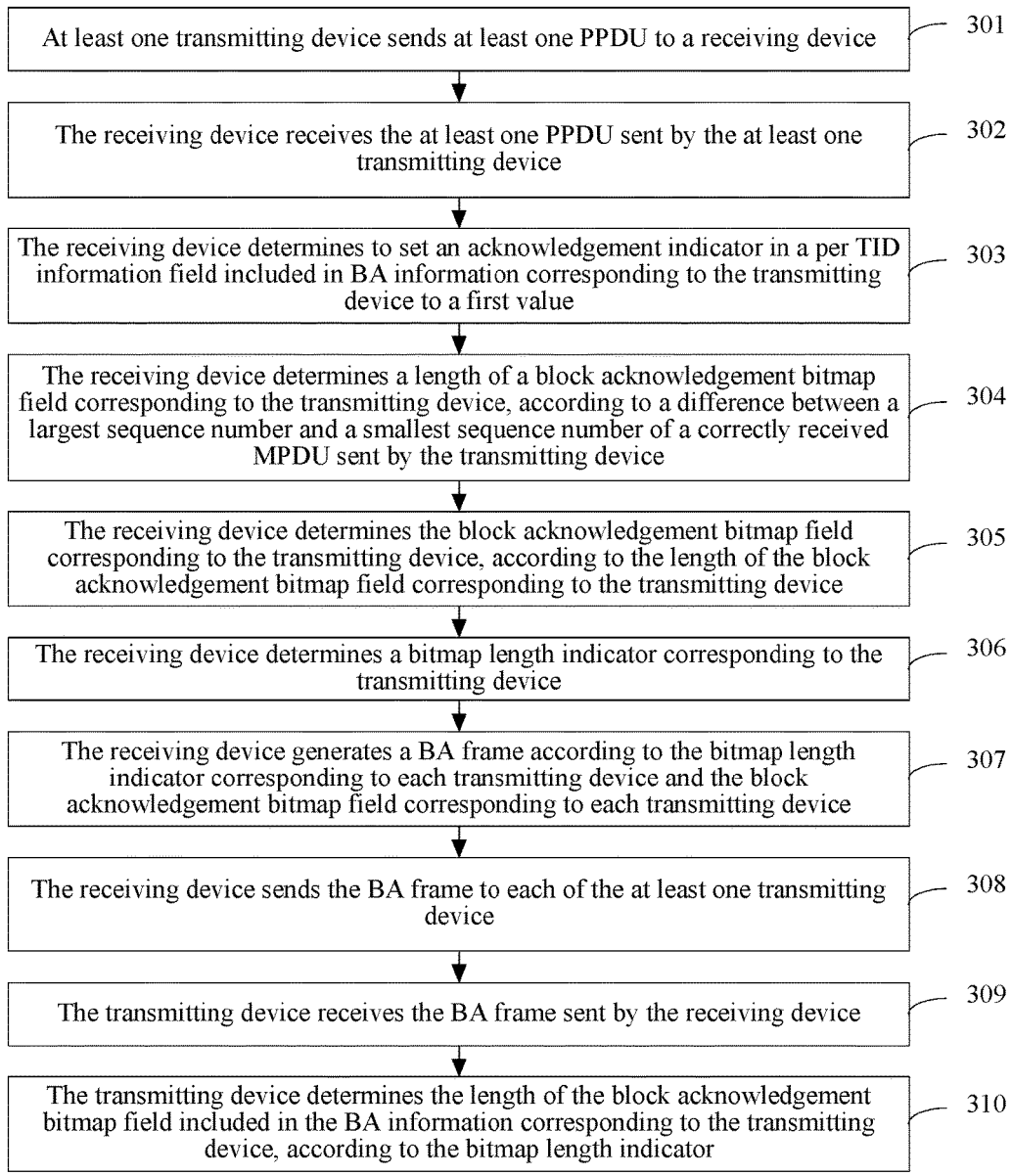
FIG. 4 is a flowchart of a block acknowledgement frame transmission method according to another embodiment of the present invention.

Another embodiment of the present invention provides a block acknowledgement frame transmission method. As shown in FIG. 4, the method may include the following steps.

301: At least one transmitting device sends at least one PPDU to a receiving device.

The PPDU sent by each transmitting device may include at least one MPDU.

302: The receiving device receives the at least one PPDU sent by the at least one transmitting device.

As stipulated in a standard, after receiving the at least one PPDU sent by each of the at least one transmitting device, the receiving device needs to reply to the transmitting device with acknowledgement information, that is, the receiving device needs to generate a BA frame according to a receiving status of the at least one MPDU in the at least one PPDU sent by each of the at least one transmitting device. In this embodiment of the present invention, first the receiving device needs to determine information required for generating the BA frame, according to the receiving status of the at least one MPDU in the at least one PPDU sent by each of the at least one transmitting device, and then generates the BA frame according to the determined information required for generating the BA frame. The determining information required for generating the BA frame, for each of the at least one transmitting device may specifically include the following step 303 to step 306, and the generating the BA frame according to the determined information required for generating the BA frame specifically includes the following step 307.

303: The receiving device determines to set an acknowledgement indicator in a per TID information field included in BA information corresponding to the transmitting device to a first value.

The first value represents a block acknowledgement starting sequence control field and a block acknowledgement bitmap field that are included in the BA information corresponding to the transmitting device.

For example, the acknowledgement indicator may be an ACK/BA indicator, and a corresponding first value may be BA. In the prior art, when the receiving device determines that an MPDU that is not correctly received exists in the at least one MPDU sent by the transmitting device, the receiving device needs to set the ACK/BA indicator in the per TID information field included in the BA information corresponding to the transmitting device to the BA, and in this case, the BA information corresponding to the transmitting device includes the per TID information field, a Block Ack Starting Sequence Control field, and a BA Bitmap field. Specifically, when the PPDU sent by the transmitting device includes only one MPDU, if the receiving device determines that the MPDU is not correctly received, the receiving device sets the ACK/BA indicator in the per TID information field included in the BA information corresponding to the transmitting device to the BA. When the PPDU sent by the transmitting device includes at least two MPDUs, if the receiving device determines that at least one MPDU in the at least two MPDUs is not correctly received, the receiving device sets the ACK/BA indicator in the per TID information field included in the BA information corresponding to the transmitting device to the BA. When the receiving device determines that no MPDU that is not correctly received exists in the at least one MPDU sent by the transmitting device, the receiving device needs to set the ACK/BA indicator in the per TID information field included in the BA information corresponding to the transmitting device to ACK, and in this case, the BA information corresponding to the transmitting device includes only the per TID information field, and does not include a Block Ack Starting Sequence Control field or a BA Bitmap field. Therefore, before determining the length of the block acknowledgement bitmap field corresponding to the transmitting device, according to a largest sequence number and a smallest sequence number of a correctly received MPDU sent by the transmitting device, the receiving device may first determine whether to set the ACK/BA indicator in the per TID information field included in the BA information corresponding to the transmitting device to the BA, and after determining to set the ACK/BA indicator in the per TID information field included in the BA information corresponding to the transmitting device to the BA, performs an operation of determining the length of the block acknowledgement bitmap field corresponding to the transmitting device, according to the difference between the largest sequence number and the smallest sequence number of the correctly received MPDU sent by the transmitting device.

304: The receiving device determines a length of a block acknowledgement bitmap field corresponding to the transmitting device, according to a difference between a largest sequence number and a smallest sequence number of a correctly received MPDU sent by the transmitting device.

In this embodiment of the present invention, the length of the block acknowledgement bitmap field may be indicated by the bitmap length indicator, the bitmap length indicator may be carried in a fragment number subfield in the block acknowledgement starting sequence control field included in the BA information corresponding to the transmitting device in the BA frame, and a length of the fragment number subfield is four bits.

For example, in a first possible implementation manner, for a common BA frame, that is, an application scenario in which no fragment is used, the Fragment Number subfield (three bits of all four bits) is used to carry the bitmap length indicator. Because a length of the BA frame is in byte, a length of the BA Bitmap field should also be an integer multiple of a byte. Therefore, a specific process of determining, by the receiving device, the length of the block acknowledgement bitmap field according to the difference between the largest sequence number and the smallest sequence number of the correctly received MPDU sent by the transmitting device may be: first determining the difference between the largest sequence number and the smallest sequence number of the correctly received MPDU sent by the transmitting device, and substituting the difference into formula 1: $\lceil (x+1)\div 8 \rceil$ (x is the difference and $\lceil \ \rceil$ represents rounding up) to obtain a calculation result, where the calculation result is the length of the block acknowledgement bitmap field (a unit of the determined length of the block acknowledgement bitmap field is byte).

In a second possible implementation manner, for a basic BA variant of a common BA frame, a largest length of a BA Bitmap field in the BA frame is 128 bytes. The basic BA variant is applicable to a scenario in which a fragment is used, and each MPDU is allowed to be divided into a maximum of 16 fragments. In this way, 16 bits are needed in a BA Bitmap field to feed back whether each MPDU is correctly received, and a maximum of 64 MPDUs can be aggregated in a PPDU. Therefore, the largest length of the BA Bitmap field is 128 bytes. In this case, a Fragment Number subfield (all four bits) may be used to carry the bitmap length indicator. In this scenario, a specific process of determining, by the receiving device, the length of the block acknowledgement bitmap field according to the difference between the largest sequence number and the smallest sequence number of the correctly received MPDU sent by the transmitting device may be: first determining the difference between the largest sequence number and the smallest sequence number of the correctly received MPDU sent by the transmitting device, and substituting the difference into formula 2: $2\times\lceil (x+1)\div 4 \rceil \times 4$ (x is the difference and $\lceil \ \rceil$ represents rounding up) to obtain a calculation result, where the calculation result is the length of the block acknowledgement bitmap field (a unit of the determined length of the block acknowledgement bitmap field is byte).

In a third possible implementation manner, for a basic BA variant of a common BA frame, a Fragment Number subfield (all four bits) may be used to carry the bitmap length indicator. In this scenario, a specific process of determining, by the receiving device, the length of the block acknowledgement bitmap field according to the difference between the largest sequence number and the smallest sequence number of the correctly received MPDU sent by the transmitting device may be as follows.

The receiving device determines a quantity of MPDUs whose receiving statuses need to be fed back, according to the difference between the largest sequence number and the smallest sequence number of the correctly received MPDU sent by the transmitting device.

First, the receiving device calculates the difference between the largest sequence number and the smallest sequence number of the correctly received MPDU sent by the transmitting device, and substitutes the difference into formula 3: ⌈(x+1)÷8⌉×8 to obtain a calculation result, where the calculation result is the quantity of MPDUs whose receiving statuses need to be fed back.

The receiving device determines a quantity of bytes required for feeding back whether an MPDU is correctly received, according to a largest fragment number of the correctly received MPDU sent by the transmitting device.

If the receiving device determines that a largest fragment number of a correctly received fragment of at least one MPDU in all correctly received MPDUs sent by the transmitting device is greater than or equal to 8, the receiving device determines that the quantity of bytes required for feeding back whether an MPDU is correctly received is two bytes (16 bits). If the receiving device determines that largest fragment numbers of correctly received fragments of all correctly received MPDUs sent by the transmitting device are all less than 8, the receiving device determines that the quantity of bytes required for feeding back whether an MPDU is correctly received is one byte (eight bits).

The receiving device determines the length of the block acknowledgement bitmap field corresponding to the transmitting device, according to the quantity of MPDUs whose receiving statuses need to be fed back and the quantity of bytes required for feeding back whether an MPDU is correctly received.

The quantity of MPDUs whose receiving statuses need to be fed back and the quantity of bytes required for feeding back whether an MPDU is correctly received are substituted into formula 4: A×B (A represents the quantity of MPDUs whose receiving statuses need to be fed back, A is calculated according to formula 3, and B represents the quantity of bytes required for feeding back whether an MPDU is correctly received) to obtain a calculation result, where the calculation result is the length of the block acknowledgement bitmap field (a unit of the determined length of the block acknowledgement bitmap field is byte).

305: The receiving device determines the block acknowledgement bitmap field corresponding to the transmitting device, according to the length of the block acknowledgement bitmap field corresponding to the transmitting device.

After the receiving device determines the length of the block acknowledgement bitmap field corresponding to the transmitting device, according to the difference between the largest sequence number and the smallest sequence number of the correctly received MPDU sent by the transmitting device, the receiving device may determine the block acknowledgement bitmap field corresponding to the transmitting device, according to the determined length of the block acknowledgement bitmap field corresponding to the transmitting device and the receiving status of at least one MPDU in the at least one PPDU sent by the transmitting device.

For example, for a common BA frame, that is, a scenario in which no fragment is used, assuming that the PPDU sent by the transmitting device includes 15 MPDUs, and sequence numbers of correctly received MPDUs in the 15 MPDUs are respectively 4, 7, 8, 9, and 12, because MPDUs that are not correctly received exist in the 15 MPDUs, the ACK/BA indicator in the per TID information field included in the BA information corresponding to the transmitting device is set to the BA. In this case, after the receiving device determines to set the ACK/BA indicator in the per TID information field included in the BA information corresponding to the transmitting device to the BA, and determines, according to the difference between the largest sequence number and the smallest sequence number of the correctly received MPDU sent by the transmitting device and formula 1: ⌈(8+1)÷8⌉ in step 304, that the length of the block acknowledgement bitmap field corresponding to the transmitting device is two bytes, the receiving device determines, according to receiving statuses of the 15 MPDUs and the determined length of the block acknowledgement bitmap field corresponding to the transmitting device, that the block acknowledgement bitmap field corresponding to the transmitting device is 0001001110010000. In the block acknowledgement bitmap field, 1 represents that an MPDU corresponding to the sequence number is correctly received, 0 represents that an MPDU corresponding to the sequence number is not correctly received, and it needs to be indicated in the Block Ack Starting Sequence Control field that a starting sequence number is 0.

306: The receiving device determines a bitmap length indicator corresponding to the transmitting device.

In a first possible implementation manner, when the length of the block acknowledgement bitmap field is determined by using the first or second implementation manner in step 304, the determining, by the receiving device, a bitmap length indicator corresponding to the transmitting device may be specifically: determining, by the receiving device, the bitmap length indicator corresponding to the transmitting device, according to the length of the block acknowledgement bitmap field corresponding to the transmitting device and a first preset mapping relationship.

The first mapping relationship is used to indicate a bitmap length indicator corresponding to a length of at least one block acknowledgement bitmap field.

Figure 5:
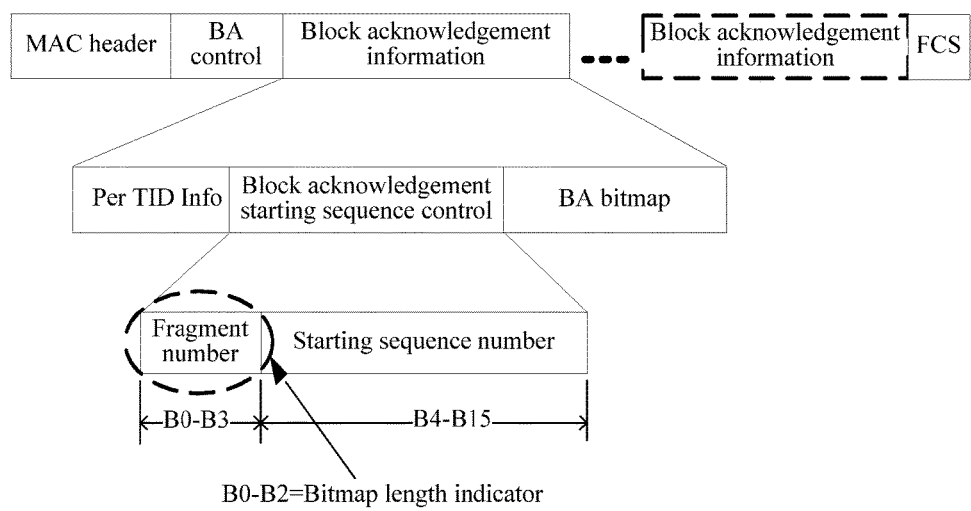
FIG. 5 is a schematic structural diagram of a BA frame according to an embodiment of the present invention.

For example, for a common BA frame, that is, a scenario in which no fragment is used, as shown in FIG. 5, in an example in which three bits (assuming that B0 to B2 of the fragment number subfield in the block acknowledgement starting sequence control field are used) of the fragment number subfield in the block acknowledgement starting sequence control field is used to carry the bitmap length indicator as an example (certainly, all four bits of the fragment number subfield may be used to carry the bitmap length indicator. However, considering that a length of a MAC frame is in byte, it is unnecessary to use a granularity unit less than one byte. That is, preferably, three bits of the fragment number subfield in the block acknowledgement starting sequence control field are used to carry the bitmap length indicator), a correspondence between lengths of different block acknowledgement bitmap fields and bitmap length indicators may be shown in Table 1.

TABLE 1

| Length of the block acknowledgement bitmap field (unit: byte) | Bitmap length indicator | Binary number |
| --- | --- | --- |
| 1 | 0 | 000 |
| 2 | 1 | 001 |
| 3 | 2 | 010 |
| 4 | 3 | 011 |
| 5 | 4 | 100 |
| 6 | 5 | 101 |
| 7 | 6 | 110 |
| 8 | 7 | 111 |

For example, the PPDU sent by the transmitting device includes 20 MPDUs, and sequence numbers of correctly received MPDUs in the 20 MPDUs are respectively 3, 5, 8, 10, 12, and 15. In this case, the receiving device may first determine the difference 12 between the largest sequence number 15 and the smallest sequence number 3 of the correctly received MPDUs sent by the transmitting device, and determines, according to the difference 12 and formula 1: $\lceil(x+1)\div 8\rceil$ (x is the difference and $\lceil\ \rceil$ represents rounding up) in step 304 in this embodiment of the present invention, that the length of the block acknowledgement bitmap field corresponding to the transmitting device is two bytes. In this case, the receiving device may determine, according to the length two bytes of the block acknowledgement bitmap field corresponding to the transmitting device and the first mapping relationship shown in Table 1, that the bitmap length indicator corresponding to the transmitting device is 1, and a corresponding binary number is 001.

For example, for a basic BA variant of a common BA frame, that is, an application scenario in which a fragment is used, all four bits of the fragment number subfield may be used to represent the bitmap length indicator. In this case, a correspondence between lengths of different block acknowledgement bitmap fields and bitmap length indicators may be shown in Table 2.

TABLE 2

| Length of the block acknowledgement bitmap field (unit: byte) | Bitmap length indicator | Binary number |
| --- | --- | --- |
| 8 | 0 | 0000 |
| 16 | 1 | 0001 |
| 24 | 2 | 0010 |
| 32 | 3 | 0011 |
| 40 | 4 | 0100 |
| 48 | 5 | 0101 |
| 56 | 6 | 0110 |
| 64 | 7 | 0111 |
| 72 | 8 | 1000 |
| 80 | 9 | 1001 |
| 88 | 10 | 1010 |
| 96 | 11 | 1011 |
| 104 | 12 | 1100 |
| 112 | 13 | 1101 |
| 120 | 14 | 1110 |
| 128 | 15 | 1111 |

For example, the PPDU sent by the transmitting device includes 25 MPDUs, and sequence numbers of correctly received MPDUs in the 25 MPDUs are respectively 5, 8, 10, 12, 15, 18, and 22. In this case, the receiving device may first determine the difference 17 between the largest sequence number 22 and the smallest sequence number 5 of the correctly received MPDUs sent by the transmitting device, and determines, according to the difference 17 and formula 2: $2\times\lceil(x+1)\div 4\rceil\times 4$ in step 304 in this embodiment of the present invention, that the length of the block acknowledgement bitmap field corresponding to the transmitting device is 40 bytes. In this case, the receiving device may determine, according to the length, that is, 40 bytes, of the block acknowledgement bitmap field corresponding to the transmitting device and the first mapping relationship shown in Table 2, that the bitmap length indicator corresponding to the transmitting device is 4, and a corresponding binary number is moo.

In a second possible implementation manner, when the length of the block acknowledgement bitmap field is determined by using the third implementation manner in step 304, the determining, by the receiving device, a bitmap length indicator corresponding to the transmitting device may be specifically implemented by using the following substeps.

The receiving device determines a quantity indicator corresponding to the transmitting device, according to the quantity of MPDUs whose receiving statuses need to be fed back and a preset second mapping relationship.

The quantity indicator is used to indicate the quantity of MPDUs whose receiving statuses need to be fed back, and the second mapping relationship is used to indicate a quantity indicator corresponding to a quantity of at least one MPDU whose receiving status needs to be fed back.

For example, in an example in which three bits of the fragment number subfield in the block acknowledgement starting sequence control field are used to carry the quantity indicator as an example, the second mapping relationship may be shown in Table 3.

TABLE 3

| Quantity of MPDUs whose receiving statuses need to be fed back | Quantity indicator | Binary number |
| --- | --- | --- |
| 8 | 0 | 000 |
| 16 | 1 | 001 |
| 24 | 2 | 010 |
| 32 | 3 | 011 |
| 40 | 4 | 100 |
| 48 | 5 | 101 |
| 56 | 6 | 110 |
| 64 | 7 | 111 |

For example, the determined quantity of MPDUs whose receiving statuses need to be fed back is 24. It may be determined, according to the second mapping relationship shown in Table 3, that the quantity indicator is 2 and a corresponding binary number is 010.

The receiving device determines a flag indicator corresponding to the transmitting device, according to a largest fragment number of the correctly received MPDU sent by the transmitting device.

The flag indicator is used to indicate the quantity of bytes required for feeding back whether an MPDU is correctly received.

Specifically, if the receiving device determines that a largest fragment number of a correctly received fragment of at least one MPDU in all correctly received MPDUs sent by the transmitting device is greater than or equal to 8, the receiving device determines that the quantity of bytes required for feeding back whether an MPDU is correctly received is two bytes (16 bits). That is, when the receiving device determines that the largest fragment number of the correctly received fragment of at least one MPDU in all correctly received MPDUs sent by the transmitting device is greater than or equal to 8, the flag indicator used to indicate that the quantity of bytes required for feeding back whether an MPDU is correctly received is two bytes is determined as the flag indicator corresponding to the transmitting device. If the receiving device determines that largest fragment numbers of correctly received fragments of all correctly received MPDUs sent by the transmitting device are all less than 8, the receiving device determines that the quantity of bytes required for feeding back whether an MPDU is correctly received is one byte (eight bits). That is, when the receiving device determines that the largest fragment numbers of the correctly received fragments of all correctly received MPDUs sent by the transmitting device are all less than 8, the flag indicator used to indicate that the quantity of bytes required for feeding back whether an MPDU is correctly received is one byte is determined as the flag indicator corresponding to the transmitting device.

For example, in an example in which one bit of the fragment number subfield in the block acknowledgement starting sequence control field is used to carry the flag indicator as an example, assuming that when the one bit is "1", it represents that the quantity of bytes required for feeding back whether an MPDU is correctly received is 1, and when the one bit is "0", it represents that the quantity of bytes required for feeding back whether an MPDU is correctly received is 2. When the receiving device determines that the largest fragment number of the correctly received fragment of at least one MPDU in all correctly received MPDUs sent by the transmitting device is greater than or equal to 8, "0" is determined as the flag indicator corresponding to the transmitting device, and when the receiving device determines that the largest fragment numbers of the correctly received fragments of all correctly received MPDUs sent by the transmitting device are all less than 8, "1" is determined as the flag indicator corresponding to the transmitting device.

The receiving device combines the quantity indicator corresponding to the transmitting device and the flag indicator corresponding to the transmitting device, to generate the bitmap length indicator corresponding to the transmitting device.

Figure 6:
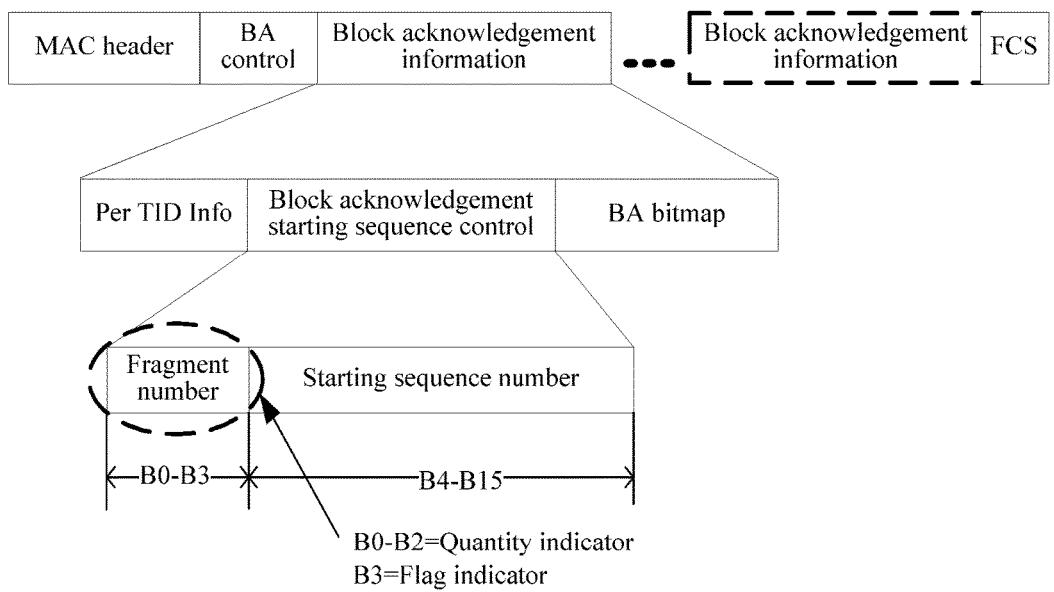
FIG. 6 is a schematic structural diagram of another BA frame according to an embodiment of the present invention.

For example, as shown in FIG. 6, assuming that the first three bits (for example, B0 to B2) of the fragment number subfield are used to carry the quantity indicator, the fourth bit (for example, B3) is used to carry the flag indicator, the determined quantity indicator is 010, and the flag indicator is "1", the generated bitmap length indicator is 0101.

Certainly, the receiving device may perform the foregoing step 303 to step 306 for each of the at least one transmitting device, to obtain the bitmap length indicator and the block acknowledgement bitmap field that correspond to each of the at least one transmitting device, and perform the following step 307 after obtaining the bitmap length indicator and the block acknowledgement bitmap field that correspond to each of the at least one transmitting device.

307: The receiving device generates a BA frame according to the bitmap length indicator corresponding to each transmitting device and the block acknowledgement bitmap field corresponding to each transmitting device.

The bitmap length indicator corresponding to the transmitting device is included in the block acknowledgement starting sequence control field included in the BA information corresponding to the transmitting device in the BA frame. Preferably, the bitmap length indicator corresponding to the transmitting device is carried in the fragment number subfield in the block acknowledgement starting sequence control field included in the BA information corresponding to the transmitting device in the BA frame.

308: The receiving device sends the BA frame to each of the at least one transmitting device.

After the receiving device sends the BA frame to each of the at least one transmitting device in step 308, for each of the at least one transmitting device, the following step 309 and step 310 may be performed.

309: The transmitting device receives the BA frame sent by the receiving device.

310: The transmitting device determines the length of the block acknowledgement bitmap field included in the BA information corresponding to the transmitting device, according to the bitmap length indicator.

When the receiving device determines the length of the block acknowledgement bitmap field by using the first or second implementation manner in step 304 in this embodiment of the present invention, the determining, by the transmitting device, the length of the block acknowledgement bitmap field included in the BA information corresponding to the transmitting device, according to the bitmap length indicator includes: determining, by the transmitting device, the length of the block acknowledgement bitmap field included in the BA information corresponding to the transmitting device, according to the bitmap length indicator and a preset first mapping relationship, where the first mapping relationship is used to indicate a length of a block acknowledgement bitmap field corresponding to at least one bitmap length indicator.

It should be noted that the first mapping relationship may be shown in Table 1 and Table 2 in step 306 in this embodiment of the present invention, and details are not described in the present invention again.

When the receiving device determines the length of the block acknowledgement bitmap field by using the third implementation manner in step 304 in this embodiment of the present invention, the determining, by the transmitting device, the length of the block acknowledgement bitmap field included in the BA information corresponding to the transmitting device, according to the bitmap length indicator includes the following substeps.

The transmitting device determines the quantity of MPDUs whose receiving statuses need to be fed back, according to the quantity indicator of the bitmap length indicator and the preset second mapping relationship. The quantity indicator is used to indicate the quantity of MPDUs whose receiving statuses need to be fed back by the receiving device, and the second mapping relationship is used to indicate a quantity indicator corresponding to a quantity of at least one MPDU whose receiving status is fed back.

For example, when the receiving device uses the fragment number subfield to carry the bitmap length indicator that includes the quantity indicator and the flag indicator, specifically, the first three bits of the fragment number subfield are used to carry the quantity indicator, and the fourth bit is used to carry the flag indicator, the transmitting device may determine the quantity of MPDUs whose receiving statuses need to be fed back, according to the first three bits of the bitmap length indicator and the preset second mapping relationship.

It should be noted that the second mapping relationship may be shown in Table 3 in step 306 in this embodiment of the present invention, and details are not described in the present invention again.

The transmitting device determines the quantity of bytes required for feeding back whether an MPDU is correctly received, according to the flag indicator in the bitmap length indicator, where the flag indicator is used to indicate the quantity of bytes required by the receiving device to feed back whether an MPDU is correctly received.

For example, when the receiving device uses the fragment number subfield to carry the bitmap length indicator that includes the quantity indicator and the flag indicator, specifically, the first three bits of the fragment number subfield are used to carry the quantity indicator, and the fourth bit is used to carry the flag indicator, the transmitting device may determine the quantity of bytes required for feeding back whether an MPDU is correctly received, according to the fourth bit of the bitmap length indicator. For example, if the flag indicator is "1", the determined quantity of bytes required for feeding back whether an MPDU is correctly received is one byte, and if the flag indicator is "0", the determined quantity of bytes required for feeding back whether an MPDU is correctly received is two bytes.

The transmitting device determines the length of the block acknowledgement bitmap field included in the BA information corresponding to the transmitting device, according to the quantity of MPDUs whose receiving statuses need to be fed back and the quantity of bytes required for feeding back whether an MPDU is correctly received.

After determining the quantity of MPDUs whose receiving statuses need to be fed back and the quantity of bytes required for feeding back whether an MPDU is correctly received, the transmitting device may multiply the quantity of MPDUs whose receiving statuses need to be fed back by the quantity of bytes required for feeding back whether an MPDU is correctly received, to obtain a calculation result, where the calculation result is the length of the block acknowledgement bitmap field (a unit of the determined length of the block acknowledgement bitmap field is byte).

Further, after determining the length of the block acknowledgement bitmap field included in the BA information corresponding to the transmitting device, the transmitting device may parse the BA information according to the length of the block acknowledgement bitmap field, to obtain information about an MPDU needing to be retransmitted, so as to retransmit all MPDUs that are not successfully received by the receiving device.

In the block acknowledgement frame transmission method provided in the present invention, a receiving device receives at least one PPDU sent by at least one transmitting device, generates a BA frame according to a receiving status of at least one MPDU in the at least one PPDU sent by each of the at least one transmitting device, and sends the BA frame to each of the at least one transmitting device, where the BA frame includes BA information corresponding to each of the at least one transmitting device, the BA information includes a block acknowledgement bitmap field and a bitmap length indicator that is used to indicate a length of the block acknowledgement bitmap field, and the bitmap length indicator is carried in a block acknowledgement starting sequence control field included in the BA information corresponding to the transmitting device in the BA frame. The bitmap length indicator is used to indicate the length of the block acknowledgement bitmap field, so that the length of the block acknowledgement bitmap field in the BA information included in the BA frame does not need to be a fixed length of 64 bits, thereby resolving a resource waste problem caused by BA Bitmap field redundancy.

Figure 7:
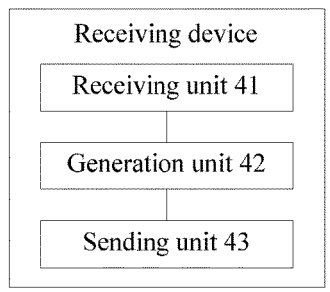
FIG. 7 is a schematic composition diagram of a receiving device according to another embodiment of the present invention.

Another embodiment of the present invention provides a receiving device. As shown in FIG. 7, the receiving device may include a receiving unit 41, a generation unit 42, and a sending unit 43.

The receiving unit 41 is configured to receive at least one physical layer convergence procedure Protocol Data Unit PPDU sent by at least one transmitting device, where the PPDU includes at least one Medium Access Control Protocol Data Unit MPDU.

The generation unit 42 is configured to generate a block acknowledgement BA frame according to a receiving status of the at least one MPDU in the at least one PPDU that is sent by each of the at least one transmitting device and that is received by the receiving unit 41.

The sending unit 43 is configured to send the BA frame generated by the generation unit 42 to each of the at least one transmitting device.

The BA frame includes BA information corresponding to each of the at least one transmitting device, the BA information includes a block acknowledgement bitmap field and a bitmap length indicator, the bitmap length indicator is used to indicate a length of the block acknowledgement bitmap field, and the bitmap length indicator is carried in a block acknowledgement starting sequence control field included in the BA information corresponding to the transmitting device in the BA frame.

Figure 8:
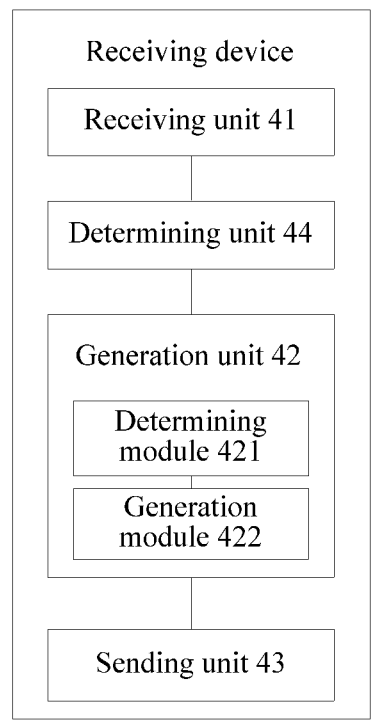
FIG. 8 is a schematic composition diagram of another receiving device according to another embodiment of the present invention.

In this embodiment of the present invention, further, as shown in FIG. 8, the generation unit 42 may include a determining module 421 and a generation module 422.

The determining module 421 is configured to: for each of the at least one transmitting device, determine the length of the block acknowledgement bitmap field corresponding to the transmitting device, according to a difference between a largest sequence number and a smallest sequence number of a correctly received MPDU sent by the transmitting device; determine the block acknowledgement bitmap field corresponding to the transmitting device, according to the length of the block acknowledgement bitmap field corresponding to the transmitting device; and determine the bitmap length indicator corresponding to the transmitting device.

The generation module 422 is configured to generate the BA frame according to the bitmap length indicator corresponding to each transmitting device and the block acknowledgement bitmap field corresponding to each transmitting device that are determined by the determining module 421.

In this embodiment of the present invention, further, the receiving device may further include a determining unit 44.

The determining unit 44 is configured to: before the generation unit 42 generates the block acknowledgement BA frame according to the receiving status of the at least one MPDU in the at least one PPDU sent by each of the at least one transmitting device, for each of the at least one transmitting device, determine to set an acknowledgement indicator in a per traffic identifier TID information field included in the BA information corresponding to the transmitting device to a first value, where the first value represents that the BA information corresponding to the transmitting device includes the block acknowledgement starting sequence control field and the block acknowledgement bitmap field.

In this embodiment of the present invention, further, the bitmap length indicator is carried in a fragment number subfield in the block acknowledgement starting sequence control field included in the BA information corresponding to the transmitting device in the BA frame.

In this embodiment of the present invention, further, the determining module 421 is specifically configured to determine the bitmap length indicator corresponding to the transmitting device, according to the length of the block acknowledgement bitmap field corresponding to the transmitting device and a preset first mapping relationship, where the first mapping relationship is used to indicate a bitmap length indicator corresponding to a length of at least one block acknowledgement bitmap field.

In this embodiment of the present invention, further, the determining module 421 is specifically configured to: determine a quantity of MPDUs whose receiving statuses need to be fed back, according to the difference between the largest sequence number and the smallest sequence number of the correctly received MPDU sent by the transmitting device; determine a quantity of bytes required for feeding back whether an MPDU is correctly received, according to a largest fragment number of the correctly received MPDU sent by the transmitting device; and determine the length of the block acknowledgement bitmap field corresponding to the transmitting device, according to the quantity of MPDUs whose receiving statuses need to be fed back and the quantity of bytes required for feeding back whether an MPDU is correctly received.

In this embodiment of the present invention, further, the determining module 421 is specifically configured to: determine a quantity indicator corresponding to the transmitting device, according to the quantity of MPDUs whose receiving statuses need to be fed back and a preset second mapping relationship, where the quantity indicator is used to indicate the quantity of MPDUs whose receiving statuses need to be fed back, and the second mapping relationship is used to indicate a quantity indicator corresponding to a quantity of at least one MPDU whose receiving status needs to be fed back; determine a flag indicator corresponding to the transmitting device, according to the largest fragment number of the correctly received MPDU sent by the transmitting device, where the flag indicator is used to indicate the quantity of bytes required for feeding back whether an MPDU is correctly received; and combine the quantity indicator corresponding to the transmitting device and the flag indicator corresponding to the transmitting device, to generate the bitmap length indicator corresponding to the transmitting device.

It should be noted that, for detailed working processes of the function modules in the receiving device in this embodiment of the present invention, refer to detailed descriptions of a corresponding process in the method embodiment, and details are not described in this embodiment of the present invention again.

The receiving device provided in the present invention receives at least one PPDU sent by at least one transmitting device, generates a BA frame according to a receiving status of at least one MPDU in the at least one PPDU sent by each of the at least one transmitting device, and sends the BA frame to each of the at least one transmitting device, where the BA frame includes BA information corresponding to each of the at least one transmitting device, the BA information includes a block acknowledgement bitmap field and a bitmap length indicator that is used to indicate a length of the block acknowledgement bitmap field, and the bitmap length indicator is carried in a block acknowledgement starting sequence control field included in the BA information corresponding to the transmitting device in the BA frame. The bitmap length indicator is used to indicate the length of the block acknowledgement bitmap field, so that the length of the block acknowledgement bitmap field in the BA information included in the BA frame does not need to be a fixed length of 64 bits, thereby resolving a resource waste problem caused by BA Bitmap field redundancy.

Figure 9:
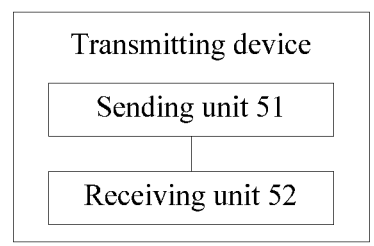
FIG. 9 is a schematic composition diagram of a transmitting device according to another embodiment of the present invention.

Another embodiment of the present invention provides a transmitting device. As shown in FIG. 9, the transmitting device may include a sending unit 51 and a receiving unit 52.

The sending unit 51 is configured to send at least one physical layer convergence procedure Protocol Data Unit PPDU to a receiving device, where the PPDU includes at least one Medium Access Control Protocol Data Unit MPDU.

The receiving unit 52 is configured to receive a block acknowledgement BA frame sent by the receiving device, where the BA frame includes BA information corresponding to the transmitting device, the BA information includes a block acknowledgement bitmap field and a bitmap length indicator, the bitmap length indicator is used to indicate a length of the block acknowledgement bitmap field, and the bitmap length indicator is carried in a block acknowledgement starting sequence control field included in the BA information corresponding to the transmitting device in the BA frame.

In this embodiment of the present invention, further, the length of the block acknowledgement bitmap field is determined by the receiving device according to a difference between a largest sequence number and a smallest sequence number of a correctly received MPDU sent by the transmitting device.

In this embodiment of the present invention, further, the bitmap length indicator is carried in a fragment number subfield in the block acknowledgement starting sequence control field included in the BA information corresponding to the transmitting device in the BA frame.

Figure 10:
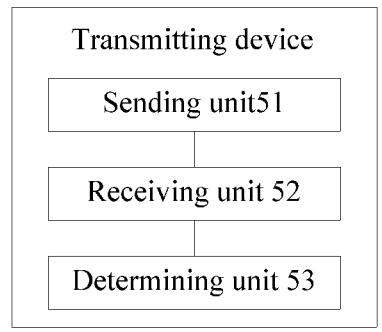
FIG. 10 is a schematic composition diagram of another transmitting device according to another embodiment of the present invention.

In this embodiment of the present invention, further, as shown in FIG. 10, the transmitting device may further include a determining unit 53.

The determining unit 53 is configured to: after the receiving unit 52 receives the block acknowledgement BA frame sent by the receiving device, determine the length of the block acknowledgement bitmap field included in the BA information corresponding to the transmitting device, according to the bitmap length indicator received by the receiving unit 52.

In this embodiment of the present invention, further, the determining unit 53 is specifically configured to determine the length of the block acknowledgement bitmap field included in the BA information corresponding to the transmitting device, according to the bitmap length indicator and a preset first mapping relationship, where the first mapping relationship is used to indicate a length of a block acknowledgement bitmap field corresponding to at least one bitmap length indicator.

In this embodiment of the present invention, further, the determining unit 53 is specifically configured to: determine a quantity of MPDUs whose receiving statuses need to be fed back, according to a quantity indicator in the bitmap length indicator and a preset second mapping relationship, where the quantity indicator is used to indicate the quantity of MPDUs whose receiving statuses need to be fed back by the receiving device, and the second mapping relationship is used to indicate a quantity indicator corresponding to a quantity of at least one MPDU whose receiving status is fed back; determine a quantity of bytes required for feeding back whether an MPDU is correctly received, according to a flag indicator in the bitmap length indicator, where the flag indicator is used to indicate the quantity of bytes required by the receiving device to feed back whether an MPDU is correctly received; and determine the length of the block acknowledgement bitmap field included in the BA information corresponding to the transmitting device, according to the quantity of MPDUs whose receiving statuses need to be fed back and the quantity of bytes required for feeding back whether an MPDU is correctly received.

It should be noted that, for detailed working processes of the function modules in the transmitting device in this embodiment of the present invention, refer to detailed descriptions of a corresponding process in the method embodiment, and details are not described in this embodiment of the present invention again.

The transmitting device provided in the present invention sends at least one PPDU including at least one MPDU to a receiving device, and receives a BA frame sent by the receiving device, where the BA frame includes BA information corresponding to the transmitting device, the BA information includes a block acknowledgement bitmap field and a bitmap length indicator that is used to indicate a length of the block acknowledgement bitmap field, and the bitmap length indicator is carried in a block acknowledgement starting sequence control field included in the BA information corresponding to the transmitting device in the BA frame. The receiving device uses the bitmap length indicator to indicate the length of the block acknowledgement bitmap field, so that the length of the block acknowledgement bitmap field in the BA information included in the BA frame does not need to be a fixed length of 64 bits, thereby resolving a resource waste problem caused by BA Bitmap field redundancy.

Figure 11:
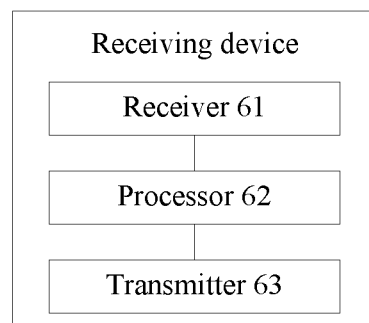
FIG. 11 is a schematic composition diagram of a receiving device according to another embodiment of the present invention.

Another embodiment of the present invention provides a receiving device. As shown in FIG. 11, the receiving device may include a receiver 61, a processor 62, and a transmitter 63.

The receiver 61 is configured to receive at least one physical layer convergence procedure Protocol Data Unit PPDU sent by at least one transmitting device, where the PPDU includes at least one Medium Access Control Protocol Data Unit MPDU.

The processor 62 is configured to generate a block acknowledgement BA frame according to a receiving status of at least one MPDU in the at least one PPDU sent by each of the at least one transmitting device.

The BA frame includes BA information corresponding to each of the at least one transmitting device, the BA information includes a block acknowledgement bitmap field and a bitmap length indicator, the bitmap length indicator is used to indicate a length of the block acknowledgement bitmap field, and the bitmap length indicator is carried in a block acknowledgement starting sequence control field included in the BA information corresponding to the transmitting device in the BA frame.

The transmitter 63 is configured to send the BA frame to each of the at least one transmitting device.

In this embodiment of the present invention, further, the processor 62 is specifically configured to: for each of the at least one transmitting device, determine the length of the block acknowledgement bitmap field corresponding to the transmitting device, according to a difference between a largest sequence number and a smallest sequence number of a correctly received MPDU sent by the transmitting device; determine the block acknowledgement bitmap field corresponding to the transmitting device, according to the length of the block acknowledgement bitmap field corresponding to the transmitting device; determine the bitmap length indicator corresponding to the transmitting device; and generate the BA frame according to the bitmap length indicator corresponding to each transmitting device and the block acknowledgement bitmap field corresponding to each transmitting device.

In this embodiment of the present invention, further, the processor 62 is further configured to: before generating the block acknowledgement BA frame according to the receiving status of the at least one MPDU in the at least one PPDU sent by each of the at least one transmitting device, for each of the at least one transmitting device, determine to set an acknowledgement indicator in a per traffic identifier TID information field included in the BA information corresponding to the transmitting device to a first value, where the first value represents that the BA information corresponding to the transmitting device includes the block acknowledgement starting sequence control field and the block acknowledgement bitmap field.

In this embodiment of the present invention, further, the bitmap length indicator is carried in a fragment number subfield in the block acknowledgement starting sequence control field included in the BA information corresponding to the transmitting device in the BA frame.

In this embodiment of the present invention, further, the processor 62 is specifically configured to determine the bitmap length indicator corresponding to the transmitting device, according to the length of the block acknowledgement bitmap field corresponding to the transmitting device and a preset first mapping relationship, where the first mapping relationship is used to indicate a bitmap length indicator corresponding to a length of at least one block acknowledgement bitmap field.

In this embodiment of the present invention, further, the processor 62 is specifically configured to: determine a quantity of MPDUs whose receiving statuses need to be fed back, according to the difference between the largest sequence number and the smallest sequence number of the correctly received MPDU sent by the transmitting device; determine a quantity of bytes required for feeding back whether an MPDU is correctly received, according to a largest fragment number of the correctly received MPDU sent by the transmitting device; and determine the length of the block acknowledgement bitmap field corresponding to the transmitting device, according to the quantity of MPDUs whose receiving statuses need to be fed back and the quantity of bytes required for feeding back whether an MPDU is correctly received.

In this embodiment of the present invention, further, the processor 62 is specifically configured to: determine a quantity indicator corresponding to the transmitting device, according to the quantity of MPDUs whose receiving statuses need to be fed back and a preset second mapping relationship, where the quantity indicator is used to indicate the quantity of MPDUs whose receiving statuses need to be fed back, and the second mapping relationship is used to indicate a quantity indicator corresponding to a quantity of at least one MPDU whose receiving status needs to be fed back; determine a flag indicator corresponding to the transmitting device, according to the largest fragment number of the correctly received MPDU sent by the transmitting device, where the flag indicator is used to indicate the quantity of bytes required for feeding back whether an MPDU is correctly received; and combine the quantity indicator corresponding to the transmitting device and the flag indicator corresponding to the transmitting device, to generate the bitmap length indicator corresponding to the transmitting device.

It should be noted that, for detailed working processes of the function modules in the receiving device in this embodiment of the present invention, refer to detailed descriptions of a corresponding process in the method embodiment, and details are not described in this embodiment of the present invention again.

The receiving device provided in the present invention receives at least one PPDU sent by at least one transmitting device, generates a BA frame according to a receiving status of at least one MPDU in the at least one PPDU sent by each of the at least one transmitting device, and sends the BA frame to each of the at least one transmitting device, where the BA frame includes BA information corresponding to each of the at least one transmitting device, the BA information includes a block acknowledgement bitmap field and a bitmap length indicator that is used to indicate a length of the block acknowledgement bitmap field, and the bitmap length indicator is carried in a block acknowledgement starting sequence control field included in the BA information corresponding to the transmitting device in the BA frame. The bitmap length indicator is used to indicate the length of the block acknowledgement bitmap field, so that the length of the block acknowledgement bitmap field in the BA information included in the BA frame does not need to be a fixed length of 64 bits, thereby resolving a resource waste problem caused by BA Bitmap field redundancy.

Figure 12:
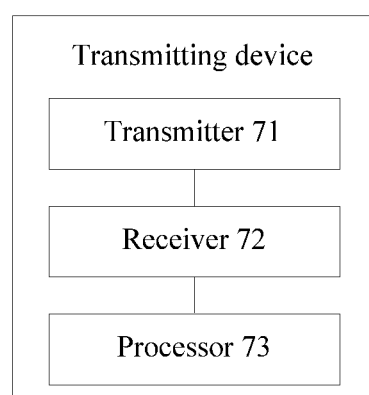
FIG. 12 is a schematic composition diagram of a transmitting device according to another embodiment of the present invention.

Another embodiment of the present invention provides a transmitting device. As shown in FIG. 12, the transmitting device may include a transmitter 71 and a receiver 72.

The transmitter 71 is configured to send at least one physical layer convergence procedure Protocol Data Unit PPDU to a receiving device, where the PPDU includes at least one Medium Access Control Protocol Data Unit MPDU.

The receiver 72 is configured to receive a block acknowledgement BA frame sent by the receiving device.

The BA frame includes BA information corresponding to the transmitting device, the BA information includes a block acknowledgement bitmap field and a bitmap length indicator, the bitmap length indicator is used to indicate a length of the block acknowledgement bitmap field, and the bitmap length indicator is carried in a block acknowledgement starting sequence control field included in the BA information corresponding to the transmitting device in the BA frame.

In this embodiment of the present invention, further, the length of the block acknowledgement bitmap field is determined by the receiving device according to a difference between a largest sequence number and a smallest sequence number of a correctly received MPDU sent by the transmitting device.

In this embodiment of the present invention, further, the bitmap length indicator is carried in a fragment number subfield in the block acknowledgement starting sequence control field included in the BA information corresponding to the transmitting device in the BA frame.

In this embodiment of the present invention, further, the transmitting device may further include a processor 73.

The processor 73 is configured to: after the receiver 72 receives the block acknowledgement BA frame sent by the receiving device, determine the length of the block acknowledgement bitmap field included in the BA information corresponding to the transmitting device, according to the bitmap length indicator.

In this embodiment of the present invention, further, the processor 73 is specifically configured to determine the length of the block acknowledgement bitmap field included in the BA information corresponding to the transmitting device, according to the bitmap length indicator and a preset first mapping relationship, where the first mapping relationship is used to indicate a length of a block acknowledgement bitmap field corresponding to at least one bitmap length indicator.

In this embodiment of the present invention, further, the processor 73 is specifically configured to: determine a quantity of MPDUs whose receiving statuses need to be fed back, according to a quantity indicator in the bitmap length indicator and a preset second mapping relationship, where the quantity indicator is used to indicate the quantity of MPDUs whose receiving statuses need to be fed back by the receiving device, and the second mapping relationship is used to indicate a quantity indicator corresponding to a quantity of at least one MPDU whose receiving status is fed back; determine a quantity of bytes required for feeding back whether an MPDU is correctly received, according to a flag indicator in the bitmap length indicator, where the flag indicator is used to indicate the quantity of bytes required by the receiving device to feed back whether an MPDU is correctly received; and determine the length of the block acknowledgement bitmap field included in the BA information corresponding to the transmitting device, according to the quantity of MPDUs whose receiving statuses need to be fed back and the quantity of bytes required for feeding back whether an MPDU is correctly received.

It should be noted that, for detailed working processes of the function modules in the transmitting device in this embodiment of the present invention, refer to detailed descriptions of a corresponding process in the method embodiment, and details are not described in this embodiment of the present invention again.

The transmitting device provided in the present invention sends at least one PPDU including at least one MPDU to a receiving device, and receives a BA frame sent by the receiving device, where the BA frame includes BA information corresponding to the transmitting device, the BA information includes a block acknowledgement bitmap field and a bitmap length indicator that is used to indicate a length of the block acknowledgement bitmap field, and the bitmap length indicator is carried in a block acknowledgement starting sequence control field included in the BA information corresponding to the transmitting device in the BA frame. The receiving device uses the bitmap length indicator to indicate the length of the block acknowledgement bitmap field, so that the length of the block acknowledgement bitmap field in the BA information included in the BA frame does not need to be a fixed length of 64 bits, thereby resolving a resource waste problem caused by BA Bitmap field redundancy.

The foregoing descriptions about implementation manners allow a person skilled in the art to understand that, for the purpose of convenient and brief description, division of the foregoing function modules is used as an example for illustration. In actual application, the foregoing functions can be allocated to different modules and implemented according to a requirement, that is, an inner structure of an apparatus is divided into different function modules to implement all or part of the functions described above.

In the several embodiments provided in the present application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected according to actual needs to achieve the objectives of the solutions of the embodiments.

In addition, function units in the embodiments of the present invention may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of the present invention. The foregoing storage medium includes: any medium that can store program code, such as a USB flash drive, a removable hard disk, a read-only memory (ROM for short), a random access memory (RAM for short), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
receiving, by a receiving device, at least one physical layer convergence procedure Protocol Data Unit (PPDU) sent by each of at least one transmitting device, wherein the at least one PPDU comprises at least one Medium Access Control Protocol Data Unit (MPDU); and
generating, by the receiving device, a block acknowledgement (BA) frame according to a receiving status of the at least one MPDU in the at least one PPDU sent by each of the at least one transmitting device, and sending the BA frame to each of the at least one transmitting device; and
wherein the BA frame comprises BA information corresponding to each of the at least one transmitting device, the BA information comprises a block acknowledgement bitmap field and a block acknowledgement starting sequence control field, and the block acknowledgement starting sequence control field comprises a bitmap length indicator that indicates a length of the block acknowledgement bitmap field, and wherein the length of the block acknowledgement bitmap field is calculated according to a first algorithm utilizing a difference between a largest sequence number and a smallest sequence number of MPDUs that have been correctly received by the receiving device, or a second algorithm utilizing a difference between a largest sequence number of MPDUs that have been correctly received by the receiving device and a smallest sequence number of MPDUs that have not been correctly received by the receiving device.

2. The method according to claim 1, wherein the bitmap length indicator is carried in a fragment number subfield in the block acknowledgement starting sequence control field comprised in the BA information corresponding to the respective transmitting device in the BA frame.

3. The method according to claim 1, wherein generating by the BA frame according to the receiving status of the at least one MPDU in the at least one PPDU sent by each of the at least one transmitting device comprises:
for each of the at least one transmitting device, determining the length of the block acknowledgement bitmap field corresponding to the respective transmitting device, determining the block acknowledgement bitmap field corresponding to the respective transmitting device according to the length of the block acknowledgement bitmap field corresponding to the respective transmitting device, and determining the bitmap length indicator corresponding to the respective transmitting device; and
generating, by the receiving device, the BA frame according to the bitmap length indicator corresponding to each transmitting device and the block acknowledgement bitmap field corresponding to each transmitting device.

4. The method according to claim 3, wherein determining the length of the block acknowledgement bitmap field corresponding to the respective transmitting device comprises:
setting a starting sequence number for feeding back receiving status of MPDUs sent by the respective transmitting device to be a smallest sequence number of correctly received MPDUs sent by the respective transmitting device; and
determining, by the receiving device, the length of the block acknowledgement bitmap field corresponding to the respective transmitting device according to the first algorithm.

5. The method according to claim 3, wherein determining the length of the block acknowledgement bitmap field corresponding to the respective transmitting device comprises:
setting a starting sequence number for feeding back receiving status of MPDUs sent by the respective transmitting device to be a smallest sequence number of incorrectly received MPDUs sent by the respective transmitting device; and
determining, by the receiving device, the length of the block acknowledgement bitmap field corresponding to the second algorithm.

6. The method according to claim 3, wherein determining the bitmap length indicator corresponding to the respective transmitting device comprises:
determining, by the receiving device, the bitmap length indicator corresponding to the respective transmitting device according to the length of the block acknowledgement bitmap field corresponding to the respective transmitting device and a preset first mapping relationship, wherein the first mapping relationship indicates a correspondence between the bitmap length indicator and the length of the block acknowledgement bitmap field.

7. The method according to claim 1, wherein before generating the BA frame according to the receiving status of the at least one MPDU in the at least one PPDU sent by each of the at least one transmitting device, the method further comprises:
for each of the at least one transmitting device, determining, by the receiving device, to set an acknowledgement indicator in a per traffic identifier (TID) information field comprised in the BA information corresponding to the respective transmitting device to a first value, wherein the first value represents that the BA information corresponding to the respective transmitting device comprises the block acknowledgement starting sequence control field and the block acknowledgement bitmap field.

8. A method, comprising:
sending, by a transmitting device, at least one physical layer convergence procedure Protocol Data Unit (PPDU) to a receiving device, wherein the PPDU comprises at least one Medium Access Control Protocol Data Unit (MPDU);

receiving, by the transmitting device, a block acknowledgement (BA) frame sent by the receiving device, wherein the BA frame comprises BA information corresponding to the transmitting device, the BA information comprises a block acknowledgement bitmap field and a block acknowledgement starting sequence control field, and the block acknowledgement starting sequence control field comprises a bitmap length indicator that indicates a length of the block acknowledgement bitmap field; and receiving, by the transmitting device from the receiving device, an indication indicating whether the length of the block acknowledgement bitmap field is calculated according to a first algorithm utilizing a difference between a largest sequence number and a smallest sequence number of MPDUs that have been correctly received by the receiving device, or a second algorithm utilizing a difference between a largest sequence number of MPDUs that have been correctly received by the receiving device and a smallest sequence number of MPDUs that have not been correctly received by the receiving device.

9. The method according to claim 8, wherein the bitmap length indicator is carried in a fragment number subfield in the block acknowledgement starting sequence control field comprised in the BA information corresponding to the transmitting device in the BA frame.

10. The method according to claim 8, wherein after receiving the BA frame sent by the receiving device, the method further comprises:

determining, by the transmitting device, the length of the block acknowledgement bitmap field comprised in the BA information corresponding to the transmitting device according to the bitmap length indicator and a preset first mapping relationship, wherein the first mapping relationship indicates the length of the block acknowledgement bitmap field corresponding to the bitmap length indicator.

11. A device, comprising:

a receiver, configured to receive at least one physical layer convergence procedure Protocol Data Unit (PPDU) sent by each of at least one transmitting device, wherein the at least one PPDU comprises at least one Medium Access Control Protocol Data Unit (MPDU);

a processor, configured to generate a block acknowledgement (BA) frame according to a receiving status of the at least one MPDU in the at least one PPDU that is sent by each of the at least one transmitting device and that is received by the receiver; and a transmitter, configured to send the BA frame generated by the processor to each of the at least one transmitting device; and wherein the BA frame comprises BA information corresponding to each of the at least one transmitting device, the BA information comprises a block acknowledgement bitmap field and a block acknowledgement starting sequence control field, and the block acknowledgement starting sequence control field comprises a bitmap length indicator that indicates a length of the block acknowledgement bitmap field, and wherein the length of the block acknowledgement bitmap field is calculated according to a first algorithm utilizing a difference between a largest sequence number and a smallest sequence number of MPDUs that have been correctly received by the device, or a second algorithm utilizing a difference between a largest sequence number of MPDUs that have been correctly received by the device and a smallest sequence number of MPDUs that have not been correctly received by the device.

12. The device according to claim 11, wherein the bitmap length indicator is carried in a fragment number subfield in the block acknowledgement starting sequence control field comprised in the BA information corresponding to the respective transmitting device in the BA frame.

13. The device according to claim 11, wherein the processor is configured to:

for each of the at least one transmitting device, determine the length of the block acknowledgement bitmap field corresponding to the respective transmitting device; determine the block acknowledgement bitmap field corresponding to the respective transmitting device, according to the length of the block acknowledgement bitmap field corresponding to the respective transmitting device; and determine the bitmap length indicator corresponding to the respective transmitting device; and generate the BA frame according to the bitmap length indicator corresponding to each transmitting device and the block acknowledgement bitmap field corresponding to each transmitting device that are determined.

14. The device according to claim 13, wherein the processor being configured to determine the length of the block acknowledgement bitmap field corresponding to the respective transmitting device comprises the processor being configured to:

set a starting sequence number for feeding back receiving status of MPDUs sent by the respective transmitting device to be a smallest sequence number of correctly received MPDUs sent by the respective transmitting device; and determine the length of the block acknowledgement bitmap field corresponding to the respective transmitting device according to the first algorithm.

15. The device according to claim 13, wherein the processor being configured to determine the length of the block acknowledgement bitmap field corresponding to the respective transmitting device comprises the processor being configured to:

set a starting sequence number for feeding back receiving status of MPDUs sent by the respective transmitting device to be a smallest sequence number of incorrectly received MPDUs sent by the respective transmitting device; and determine the length of the block acknowledgement bitmap field corresponding to the respective transmitting device according to the second algorithm.

16. The device according to claim 13, wherein the processor being configured to determine the bitmap length indicator corresponding to the respective transmitting device comprises the processor being configured to:

determine the bitmap length indicator corresponding to the respective transmitting device according to the length of the block acknowledgement bitmap field corresponding to the respective transmitting device and a preset first mapping relationship, wherein the first mapping relationship indicates the bitmap length indicator corresponding to the length of the block acknowledgement bitmap field.

17. The device according to claim 11, wherein the processor is further configured to:

before the processor generates the block acknowledgement BA frame according to the receiving status of the at least one MPDU in the at least one PPDU sent by each of the at least one transmitting device, for each of the at least one transmitting device, determine to set an acknowledgement indicator in a per traffic identifier (TID) information field comprised in the BA information corresponding to the respective transmitting device to a first value, wherein the first value represents that the BA information corresponding to the respective transmitting device comprises the block acknowledgement starting sequence control field and the block acknowledgement bitmap field.

18. A device, comprising:
a transmitter, configured to send at least one physical layer convergence procedure Protocol Data Unit (PPDU) to a receiving device, wherein the PPDU comprises at least one Medium Access Control Protocol Data Unit (MPDU); and
a receiver, configured to receive a block acknowledgement (BA) frame sent by the receiving device, wherein the BA frame comprises BA information corresponding to the device, the BA information comprises a block acknowledgement bitmap field and a block acknowledgement starting sequence control field, and the block acknowledgement starting sequence control field comprises a bitmap length indicator that indicates a length of the block acknowledgement bitmap field; and
wherein the receiver is further configured to receive, from the receiving device, an indication indicating whether the length of the block acknowledgement bitmap field is calculated according to a first algorithm utilizing a difference between a largest sequence number and a smallest sequence number of MPDUs that have been correctly received by the receiving device, or a second algorithm utilizing a difference between a largest sequence number of MPDUs that have been correctly received by the receiving device and a smallest sequence number of MPDUs that have not been correctly received by the receiving device.

19. The device according to claim 18, wherein the bitmap length indicator is carried in a fragment number subfield in the block acknowledgement starting sequence control field comprised in the BA information corresponding to the device in the BA frame.

20. The device according to claim 18, further comprising a processor, and the processor is configured to:
determine the length of the block acknowledgement bitmap field comprised in the BA information corresponding to the device, according to the bitmap length indicator and a preset first mapping relationship, wherein the first mapping relationship indicates the length of the block acknowledgement bitmap field corresponding to the bitmap length indicator.

* * * * *